United States Patent
Fukuguchi

(10) Patent No.: US 8,161,235 B2
(45) Date of Patent: Apr. 17, 2012

(54) STORAGE SYSTEM AND DATA ERASING METHOD

(75) Inventor: Hitoshi Fukuguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1049 days.

(21) Appl. No.: 12/062,136

(22) Filed: Apr. 3, 2008

(65) Prior Publication Data

US 2009/0100235 A1    Apr. 16, 2009

(30) Foreign Application Priority Data

Oct. 16, 2007    (JP) .................................. 2007-269415

(51) Int. Cl.
*G06F 12/00*    (2006.01)

(52) U.S. Cl. ...................................... 711/113; 711/135

(58) Field of Classification Search .................. 711/113, 711/135
See application file for complete search history.

(56) References Cited

U.S. PATENT DOCUMENTS

| | | | | |
|---|---|---|---|---|
| 5,734,859 A | * | 3/1998 | Yorimitsu et al. | 711/112 |
| 5,835,940 A | * | 11/1998 | Yorimitsu et al. | 711/112 |
| 7,120,739 B2 | * | 10/2006 | Fujimoto et al. | 711/113 |
| 7,249,220 B2 | * | 7/2007 | Fujimoto et al. | 711/113 |
| 7,624,230 B2 | * | 11/2009 | Kamei et al. | 711/113 |
| 2004/0221105 A1 | * | 11/2004 | Fujimoto et al. | 711/114 |
| 2006/0155944 A1 | * | 7/2006 | Kano | 711/161 |
| 2006/0242361 A1 | * | 10/2006 | Fujimoto et al. | 711/114 |
| 2007/0260811 A1 | * | 11/2007 | Merry et al. | 711/103 |
| 2008/0250210 A1 | * | 10/2008 | Ash et al. | 711/141 |

* cited by examiner

Primary Examiner — Matthew Bradley
(74) Attorney, Agent, or Firm — Brundidge & Stanger, P.C.

(57) ABSTRACT

This storage system includes a server management unit for managing in a server a maximum overwrite count and an overwrite count for overwriting the overwrite data in a disk cache, a controller cache for temporarily storing overwrite data sent from the server in the storage subsystem, a storage management unit for managing a maximum overwrite count and an overwrite count for overwriting overwrite data sent from the server in the controller cache so as to overwrite overwrite data sent from the controller cache in the hard disk drive according to the number of the maximum overwrite count, and an address management unit for managing the respective addresses of the disk cache, the controller cache and the hard disk drive storing the same file to be erased.

3 Claims, 44 Drawing Sheets

FIG.8

FILE NAME MANAGEMENT TABLE

| INODE NUMBER 210A | FILE NAME 210B |
|---|---|
| 0 | file_name |
| 1 | user_data |
| ⋮ | ⋮ |

SERVER-SIDE FILE STORAGE LOCATION MANAGEMENT TABLE

| INODE NUMBER 211A | DISK BLOCK NUMBER 211B |
|---|---|
| 0 | 5 |
| 0 | 6 |
| 0 | 7 |
| 1 | 8 |
| 1 | 11 |
| 1 | 12 |
| ⋮ | ⋮ |

211

DISK MAX MANAGEMENT TABLE

DISK FLUSH MANAGEMENT TABLE

DISK COUNT MANAGEMENT TABLE

FIG.13

SHREDDING COUNT MANAGEMENT TABLE

| SYNCHRONOUS/ASYNCHRONOUS (100A) | OVERWRITE COUNT (100B) |
|---|---|
| 0 | 3 |

SHREDDING PATTERN MANAGEMENT TABLE

| OVERWRITE COUNT NUMBER (101A) | OVERWRITE PATTERN (101B) |
|---|---|
| 0 | 00 |
| 1 | FF |
| 2 | 00 |
| ⋮ | ⋮ |

SUBSYSTEM-SIDE FILE STORAGE LOCATION MANAGEMENT TABLE

| INODE NUMBER (102A) | DISK BLOCK NUMBER (102B) |
|---|---|
| 0 | 5 |
| 0 | 6 |
| 0 | 7 |
| 1 | 8 |
| 1 | 11 |
| 1 | 12 |
| ⋮ | ⋮ |

FILE STORAGE LOCATION CACHE MANAGEMENT TABLE

| DISK CACHE ADDRESS (103A) | CONTROLLER CACHE ADDRESS (103B) |
|---|---|
| 0x00000~0x00100 | 0x00600~0x00700 |
| 0x00101~0x00200 | 0x00701~0x00800 |
| 0x00201~0x00300 | 0x00801~0x00900 |
| ⋮ | ⋮ |

103

CONTROLLER MAX MANAGEMENT TABLE

CONTROLLER FLUSH MANAGEMENT TABLE

CONTROLLER COUNT MANAGEMENT TABLE

FIG.37

SUBSYSTEM INTERNAL FILE STORAGE LOCATION
REPLICATION MANAGEMENT TABLE

| PRIMARY PHYSICAL DISK NUMBER 150A | PRIMARY PHYSICAL DISK BLOCK NUMBER 150B | SECONDARY PHYSICAL DISK NUMBER 150C | SECONDARY PHYSICAL DISK BLOCK NUMBER 150D |
|---|---|---|---|
| 0000 | 5 | 0001 | 1 |
| 0000 | 6 | 0001 | 2 |
| 0000 | 7 | 0001 | 3 |
| ⋮ | ⋮ | ⋮ | ⋮ |

INTER-SUBSYSTEM FILE STORAGE LOCATION REPLICATION MANAGEMENT TABLE

| PRIMARY STORAGE SUBSYSTEM APPARATUS NUMBER | PRIMARY PHYSICAL DISK NUMBER | PRIMARY PHYSICAL DISK BLOCK NUMBER | SECONDARY STORAGE SUBSYSTEM APPARATUS NUMBER | SECONDARY PHYSICAL DISK NUMBER | SECONDARY PHYSICAL DISK BLOCK NUMBER |
|---|---|---|---|---|---|
| 10083 | 0000 | 5 | 14016 | 0001 | 1 |
| 10083 | 0000 | 6 | 14016 | 0001 | 2 |
| 10083 | 0000 | 7 | 14016 | 0001 | 3 |
| ... | ... | ... | ... | ... | ... |

153A  153B  153C  153D  153E  153F

153

STORAGE SYSTEM AND DATA ERASING METHOD

CROSS REFERENCES

This application relates to and claims priority from Japanese Patent Application No. 2007-269415, filed on Oct. 16, 2007, the entire disclosure of which is incorporated herein by reference.

BACKGROUND

The present invention generally relates to a storage system and a data erasing method, and can be particularly applied to a storage system equipped with a cache memory.

In a storage system where a server and a storage apparatus are connected, if data is written from the server in file units into a plurality of hard disk drives in the storage apparatus, the erasure of data must also be conducted in file units.

When erasing data, in order to prevent the data to be erased from remaining in the hard disk drives as magnetic information, it is necessary to write arbitrary data over the data to be erased.

For instance, Japanese Patent Laid-Open Publication No. 2007-11522 proposes a method of erasing data to be erased in data units by writing arbitrary data over the data to be erased when a host issues a complete erasure command for erasing the data to be erased stored in the hard disk drive of the storage apparatus.

SUMMARY

In most cases, the overwriting of arbitrary data must be conducted several times in order to completely erase the data to be erased from the hard disk drive.

In a storage system configured such that a server is equipped with a disk cache for temporarily storing data and a storage apparatus is equipped with a controller cache, although arbitrary data will be written over the data to be erased temporarily stored between the disk cache and the controller cache several times when an overwrite command is issued from a CPU (Central Processing Unit) in the server, there is a problem in that, depending on the timing that the foregoing overwrite command is issued, only the final overwrite command is issued from the controller cache to the hard disk drive, and arbitrary data that is sent several times is not reflected in the hard disk drive.

If only the arbitrary data based on the final overwrite command is overwritten in the hard disk drive, there is a possibility that the data that should have been erased from the remaining magnetic information of data may be read, and this may lead to information leakage.

Thus, an object of the present invention is to propose a storage system and a data erasing method capable of reliably preventing information leakage by reflecting the overwrite data issued a plurality of times from a server in a hard disk drive according to the number of times such overwrite data was issued.

In order to achieve the foregoing object, the present invention provides a storage system including a server, and a storage subsystem connected to the server and having a hard disk drive storing a file to be erased. This storage system comprises a disk cache for temporarily storing in the server overwrite data for erasing data to be erased stored in the file to be erased, a server management unit for managing in the server a maximum overwrite count and an overwrite count for overwriting the overwrite data in the disk cache, a controller cache for temporarily storing overwrite data sent from the server in the storage subsystem, a storage management unit for managing a maximum overwrite count and an overwrite count for overwriting overwrite data sent from the server in the controller cache so as to overwrite overwrite data sent from the controller cache in the hard disk drive according to the number of the maximum overwrite count, an address management unit for managing the respective addresses of the disk cache, the controller cache and the hard disk drive storing the same file to be erased, and an erasure unit for erasing, in file units, data to be erased in a file to be erased respectively stored in the disk cache, the controller cache and the hard disk drive.

It is thereby possible to manage the number of times the overwrite data was issued, and erase, in file units, the data to be erased stored in the hard disk drive.

The present invention additionally provides a data erasing method of a storage system including a server, and a storage subsystem connected to the server and having a hard disk drive storing a file to be erased. This data erasing method comprises a step for temporarily storing in a disk cache of the server overwrite data for erasing data to be erased stored in the file to be erased, a server management step for managing in the server a maximum overwrite count and an overwrite count for overwriting the overwrite data in the disk cache, a step for temporarily storing overwrite data sent from the server in a controller cache of the storage subsystem, a storage management step for managing a maximum overwrite count and an overwrite count for overwriting overwrite data sent from the server in the controller cache so as to overwrite overwrite data sent from the controller cache in the hard disk drive according to the number of the maximum overwrite count, an address management step for managing the respective addresses of the disk cache, the controller cache and the hard disk drive storing the same file to be erased, and an erasure step for erasing, in file units, data to be erased in a file to be erased respectively stored in the disk cache, the controller cache and the hard disk drive.

It is thereby possible to manage the number of times the overwrite data was issued, and erase, in file units, the data to be erased stored in the hard disk drive.

According to the present invention, it is possible to reliably prevent information leakage by reflecting the overwrite data issued a plurality of times from a server in a hard disk drive according to the number of times such overwrite data was issued.

DESCRIPTION OF DRAWINGS

FIG. 8 is a chart showing a file name management table according to the first embodiment;

FIG. 9 is a chart showing a server-side file storage location management table according to the first embodiment;

FIG. 13 is a chart showing a shredding count management table according to the first embodiment;

FIG. 14 is a chart showing a shredding pattern management table according to the first embodiment;

FIG. 15 is a chart showing a subsystem-side file storage location management table according to the first embodiment;

FIG. 16 is a chart showing a file storage location cache management table according to the first embodiment;

FIG. 37 is a chart showing a subsystem internal file storage location replication management table according to the second embodiment;

FIG. 47 is a chart showing an inter-subsystem file storage location replication management table according to the third embodiment;

DETAILED DESCRIPTION

An embodiment of the present invention is now explained in detail with reference to the attached drawings.

(1) First Embodiment (1-1) Configuration of Storage System

Figure 1:
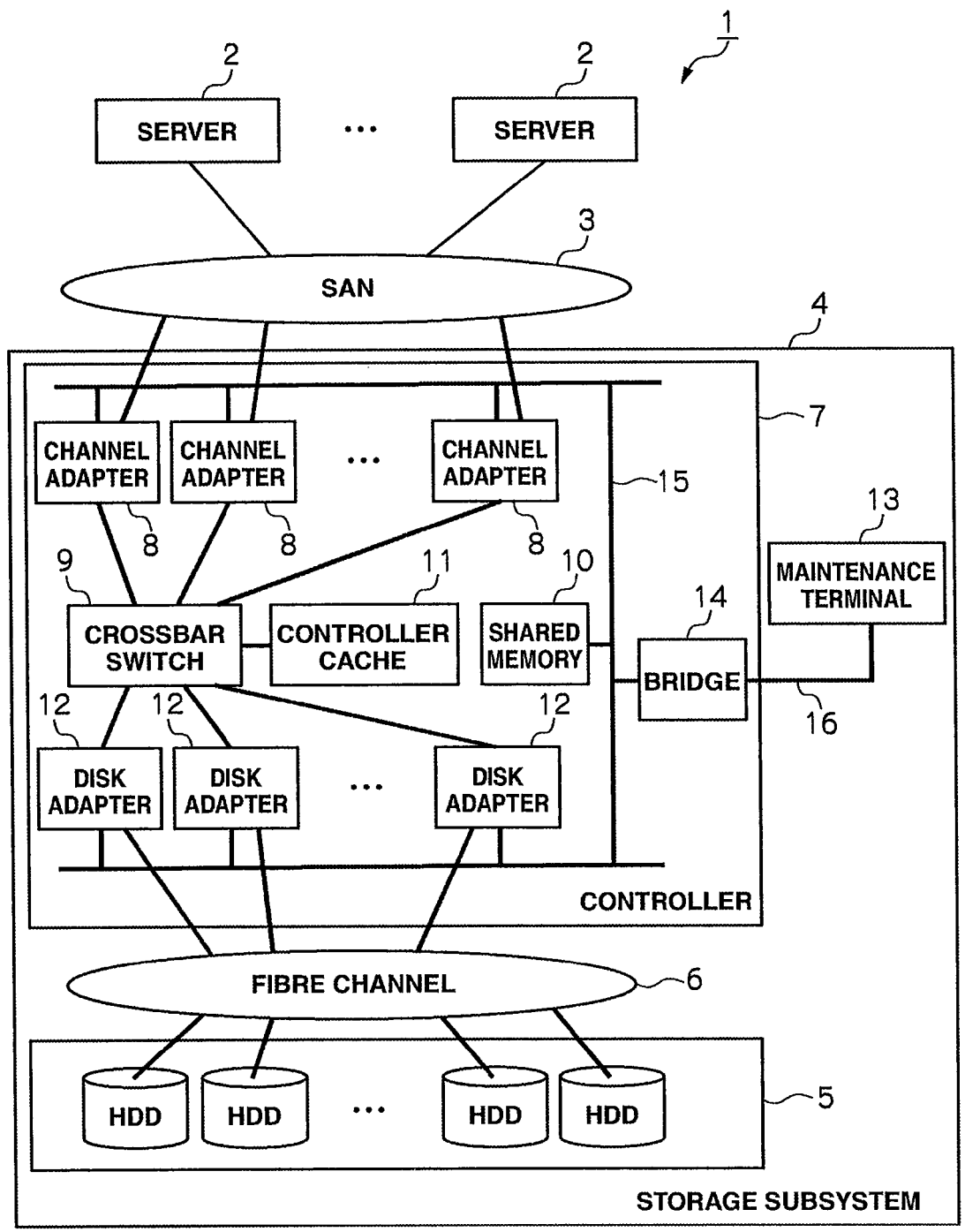
FIG. 1 is a block diagram showing the overall configuration of a storage system according to the first embodiment.

FIG. 1 shows the overall storage system 1 according to the present embodiment. The storage system 1 is configured by a server 2 being connected to a storage subsystem 4 via a SAN (Storage Area Network) 3.

Figure 2:
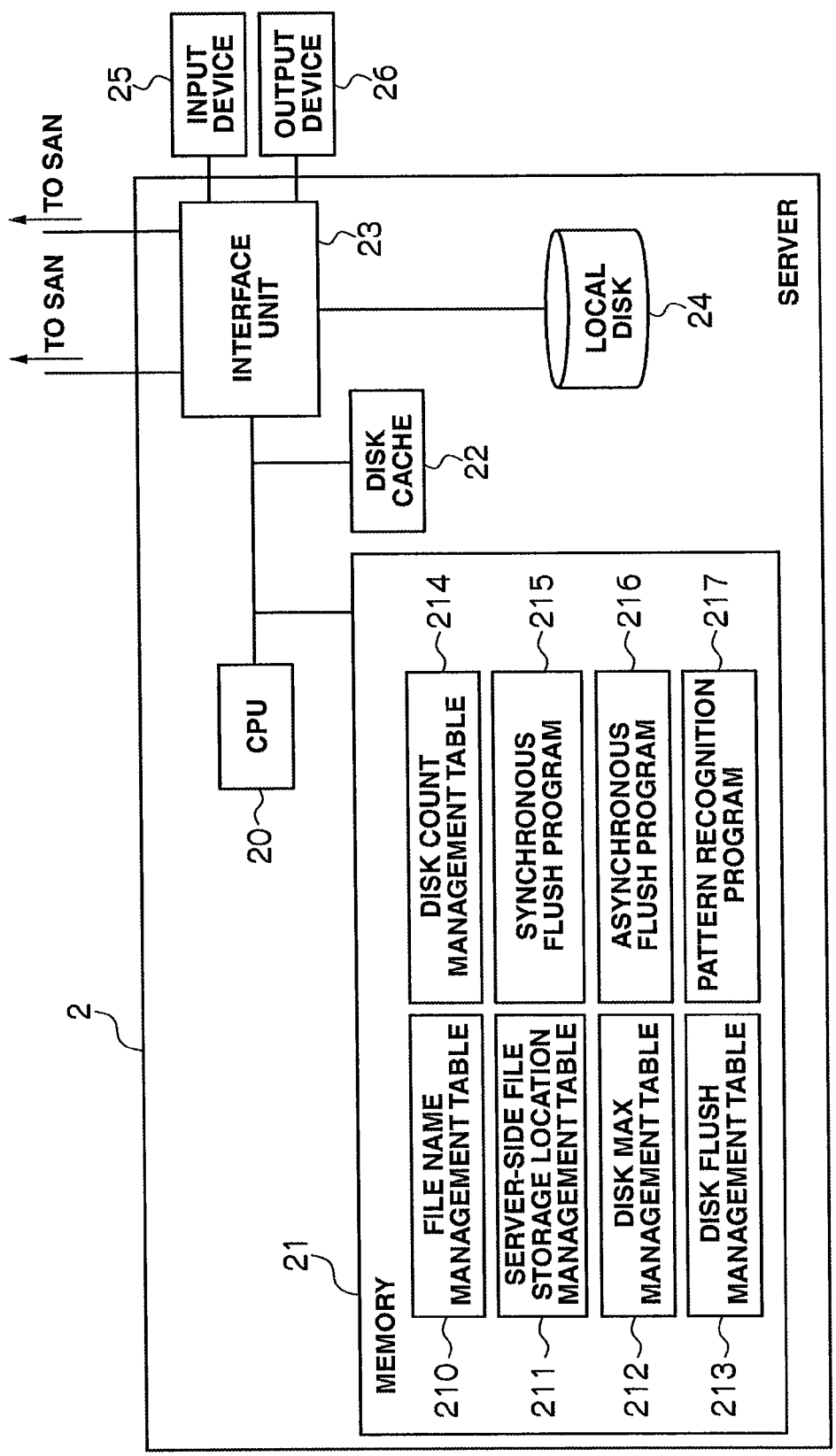
FIG. 2 is a block diagram showing the configuration of a server according to the first embodiment.

The server 2, as shown in FIG. 2, is a computer device comprising information processing resources such as a CPU 20, a memory 21, a disk cache 22, an interface unit 23, and a local disk 24, and configured so as to be connected from the interface unit 23 to another server 2 or a storage subsystem 4. The server 2 also comprises an input device 25 such as a keyboard, a switch, a pointing device or a microphone, and an output device 26 such as a monitor display or a speaker.

The memory of the server 2 stores a file name management table 210, a server-side file storage location management table 211, a disk max management table 212, a disk flush management table 213, a disk count management table 214, a synchronous flush program 215, an asynchronous flush program 216 and a pattern recognition program 217, which are all described later.

Communication between the interface unit 23 and the storage system 1 via the SAN (Storage Area Network) 3 is conducted according to a fibre channel protocol.

The storage subsystem 4 is comprises a disk drive unit 5 configured from a plurality of hard disk drives HDD, and a controller 7 for managing the plurality of hard disk drives HDD according to a RAID (Redundant Array of Independent/inexpensive Disks) configuration via a fibre channel 6.

The hard disk drives HDD, for example, are configured from expensive disks such as SCSI (Small Computer System Interface) disks, or inexpensive disks such as SATA (Serial AT Attachment) disks or optical disks. One or more logical volumes (not shown) are defined in the storage area provided by the plurality of hard disk drives HDD.

A unique identifier (LUN: Logical Unit Number) is allocated to each logical volume. In the case of this embodiment, the input and output of data is conducted by using the combination of the identifier and a unique number (LBA: Logical Block Address) that is allocated to each block as the address, and designating such address.

The controller 7 comprises a plurality of channel adapters 8, a crossbar switch 9, a shared memory 10, a controller cache 11, a plurality of disk adapters 12, and a maintenance terminal 13.

Figure 3:
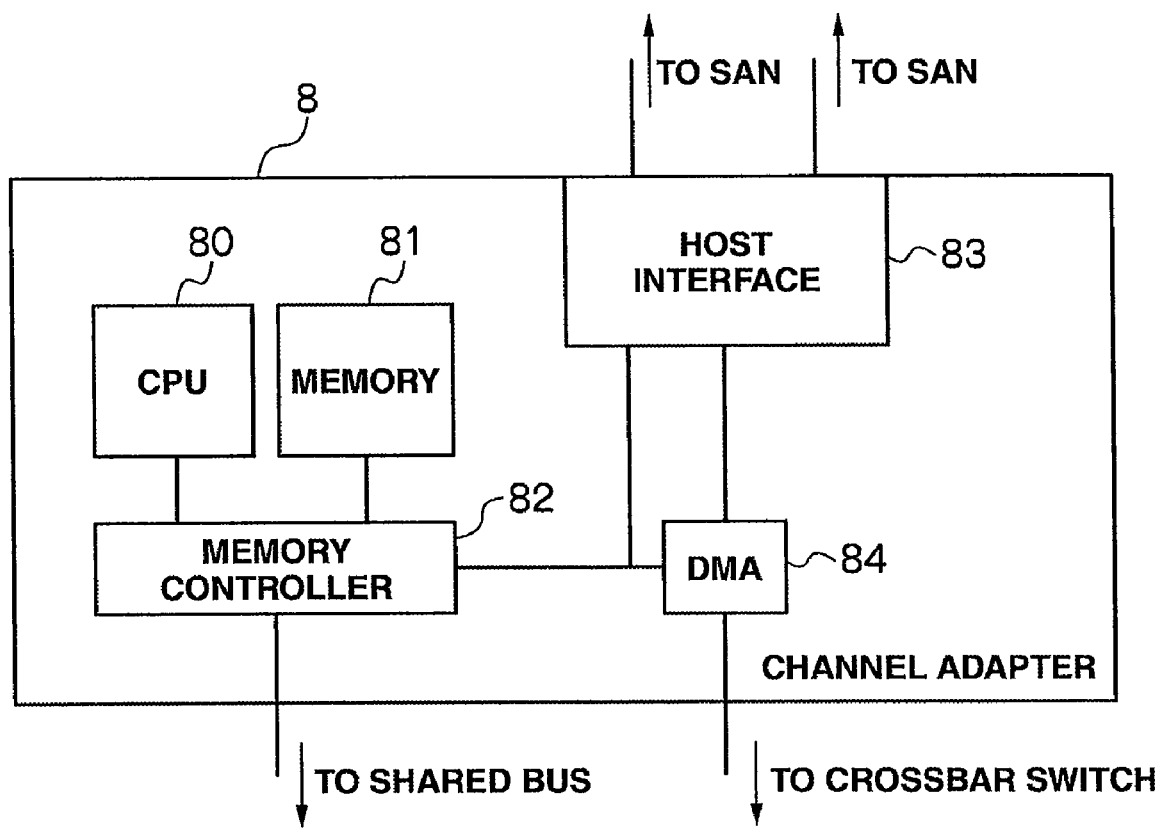
FIG. 3 is a block diagram showing the configuration of a channel adapter according to the first embodiment.

The channel adapter 8, as shown in FIG. 3, is configured as a microcomputer system comprising a CPU 80, a memory 81, a memory controller 82, a host interface 83, and a DMA (Direct Memory Access) 84, and the host interface 83 comprises a port (not shown) for connecting to the SAN 3. Each channel adapter 8 executes required processing by interpreting the various commands sent from the server 2. A network address (for instance, an IP address or WWN) for identifying the respective ports is allocated to the ports of the channel adapters 8. The CPU 80 issues commands to the host interface 83 and the DMA 84 via the memory controller 82. The DMA 84 transfers commands or data between the server 2 and the controller cache 11 via the crossbar switch 9.

The crossbar switch 9 is also connected to the controller cache 11 and the disk adapters 12 in addition to the channel adapters 8 described above. The sending and receiving of data and commands among the channel adapters 8, the controller cache 11, the shared memory 10 and the disk adapters 12 are conducted via the crossbar switch 9 or a shared bus. The crossbar switch 9, for instance, is configured from a switch such as an ultra-fast crossbar switch or a bus that performs data transfer by way of high-speed switching.

Figure 4:
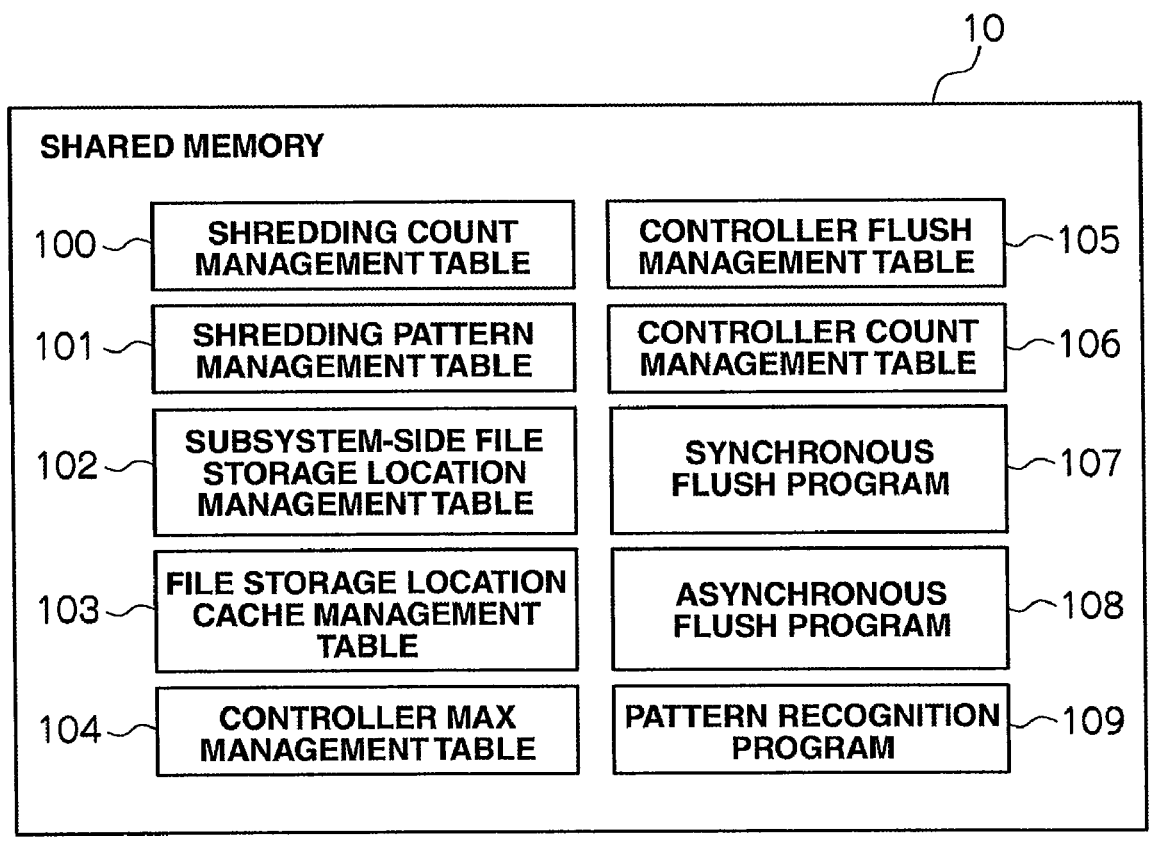
FIG. 4 is a block diagram showing the configuration of a shared memory according to the first embodiment.

The shared memory 10, as shown in FIG. 4, is a storage memory to be shared by the channel adapters 8 and the disk adapters 12. The shared memory 10 is primarily used for storing system configuration information and various control programs read from the system volume when the power of the storage subsystem 4 is turned on, or commands from the server 2. The shared memory 10 stores a shredding count management table 100, a shredding pattern management table 101, a subsystem-side file storage location management table 102, a file storage location cache management table 103, a controller max management table 104, a controller flush management table 105, a controller count management table 106, a synchronous flush program 107, an asynchronous flush program 108, and a pattern recognition program 109, which are all described later.

The controller cache 11 is also a storage memory to be shared by the channel adapters 8 and the disk adapters 12. The controller cache 11 is primarily used for temporarily storing server data to be input to and output from the storage subsystem 4.

Figure 5:
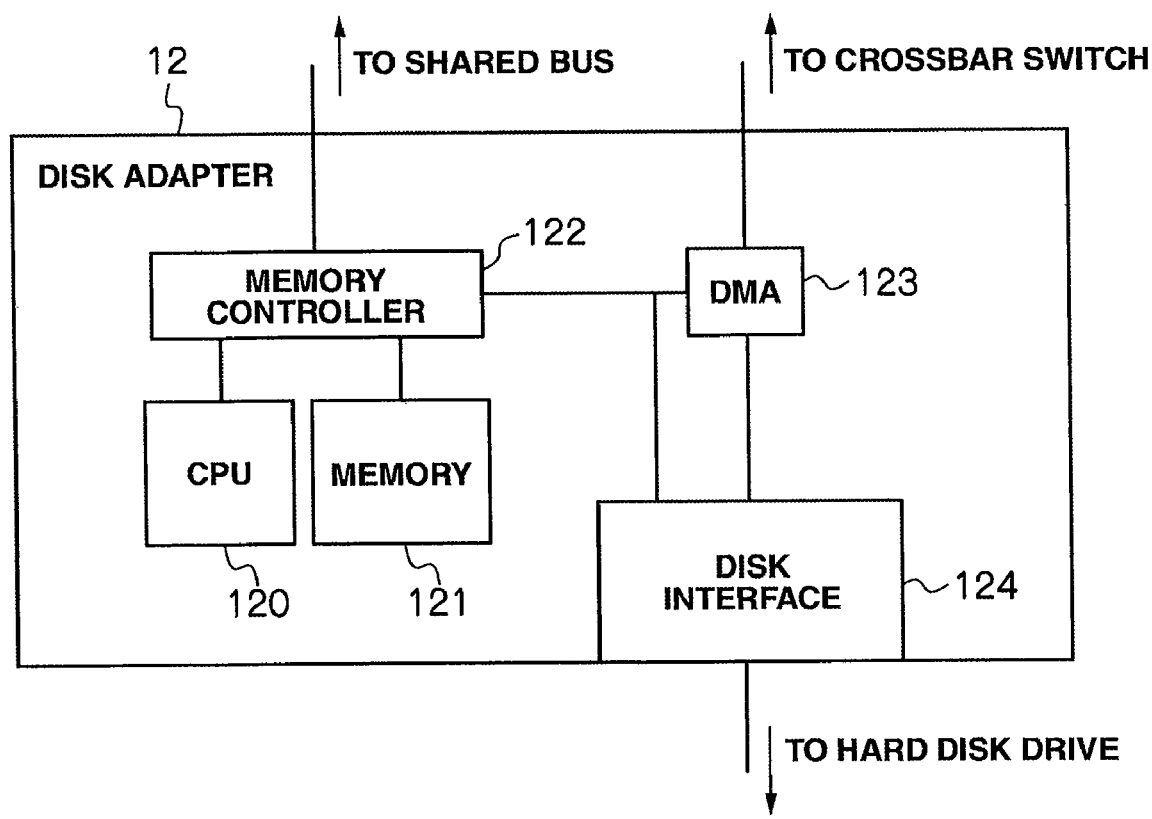
FIG. 5 is a block diagram showing the configuration of a disk adapter according to the first embodiment.

The disk adapter 12, as shown in FIG. 5, is configured as a microcomputer system comprising a CPU 120, a memory 121, a memory controller 122, a DMA 123, and a disk interface 124, and functions as an interface for performing protocol control during the communication with the disk drive unit 5. The disk adapters 12, for example, are connected to the corresponding disk drive unit 5 via the fibre channel, and send and receive data to and from the disk drive units 5 according to the fibre channel protocol. The CPU 120 issues commands to the DMA 123 and the disk interface 124 via the memory controller 122. The DMA 123 transfers commands or data between the disk interface 124 and the controller cache 11 via the crossbar switch 9.

Figure 6:
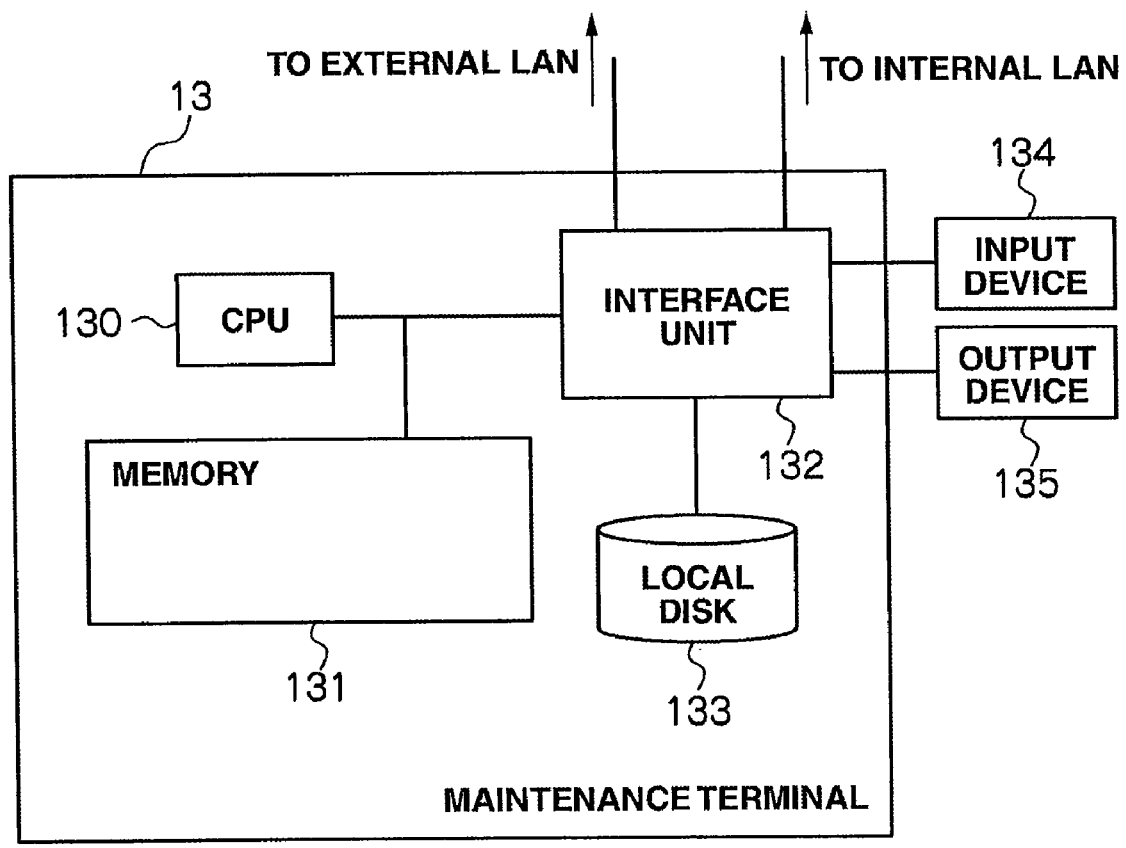
FIG. 6 is a block diagram showing the configuration of a maintenance terminal according to the first embodiment.

The maintenance terminal 13 is connected to the controller 7 via the bridge 14. The maintenance terminal 13 is a computer apparatus to be operated for the maintenance or management of the storage subsystem 4, and, as shown in FIG. 6, comprises a CPU 130, a memory 131, an interface unit 132, a local disk 133, an input device 134, and an output device 135. The administrator issues management commands from the input device 134 via the interface unit 132. In addition, the maintenance terminal 13 is able to access the shared memory 10 through the internal LAN (Local Area Network) connected to the interface unit 132. The maintenance terminal 13 is able to display the management status in the storage subsystem 4 on the output device 135, which is a display screen. If the network is a LAN, the above is performed according to a TCP/IP (Transmission Control Protocol/Internet Protocol) protocol.

(1-2) Configuration of Various Tables

Figure 7:
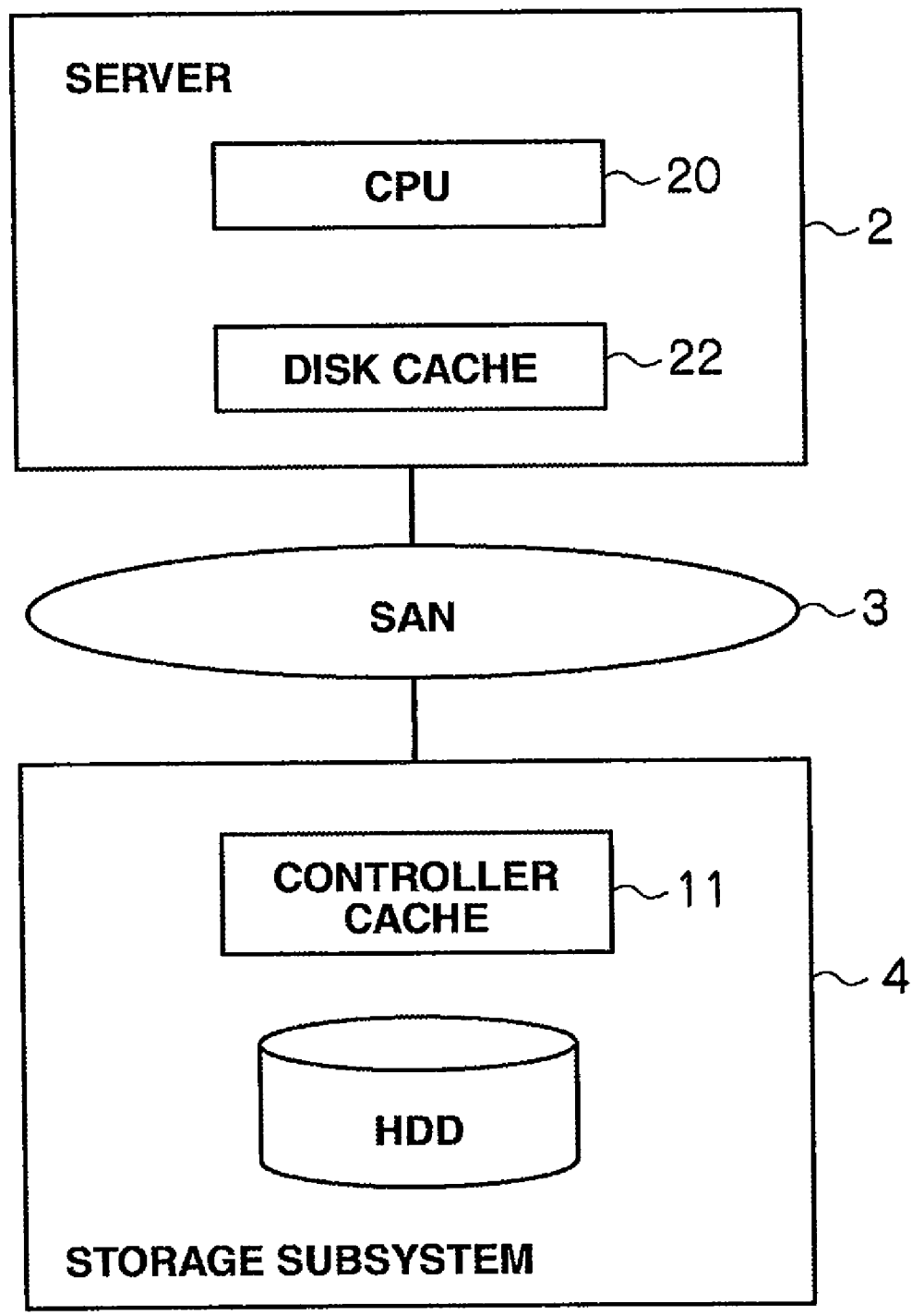
FIG. 7 is a configuration diagram showing the storage system according to the first embodiment.

The storage system 1, as shown in the schematic configuration of FIG. 7, is configured such that the disk cache 22 is loaded in the server 2, and the controller cache 22 is loaded in the storage subsystem 4. In order to erase the data to be erased stored in the hard disk drives HDD, this embodiment is characterized in that the data to be erased stored in the disk cache 22 or controller cache 11 is overwritten (erased) a plurality of times in file units according to the plurality of overwrite commands issued from the CPU 20 of the server 2, and the data to be erased stored in the hard disk drives HDD is also overwritten (erased) a plurality of times in file units.

The term "overwriting (overwrite)" as used in this embodiment refers to the overwriting of arbitrary data, which will result in the erasure of such arbitrary data.

In order to realize the features of this embodiment, foremost, various tables are stored in the memory of the server 2 and the storage subsystem 4. The configuration of the various tables is explained below.

(1-2-1) File Name Management Table

The file name management table 210 shown in FIG. 8 is a table retained by the server 2, and is used for managing the data to be erased in file units. The file name management table 210 is configured from an "inode number" column 210A and a "file name" column 210B for storing attribute information of files in the server 2. The inode number shows the file size and the block count information in the hard disk drive storing the file data.

(1-2-2) Server-Side File Storage Location Management Table

The server-side file storage location management table 211 shown in FIG. 9 is a table retained by the server 2, and is used for managing the storage destination of the hard disk drive HDD storing the file in the storage subsystem 4. By referring to the file storage location management table 211, the operator will be able to know in which block of which hard disk drive HDD the data has been written. The file storage location management table 211 is configured from an "inode number" column 211A and a "disk block number" column 211B for storing attribute information of files in the server 2.

The "disk block number" column 211B stores the block number showing the storage destination of the hard disk drive HDD storing the file.

The "inode number" column 211A is the same as the "inode number" column 210A described above, and the detailed explanation thereof is omitted.

(1-2-3) Disk Max Management Table

Figure 10:
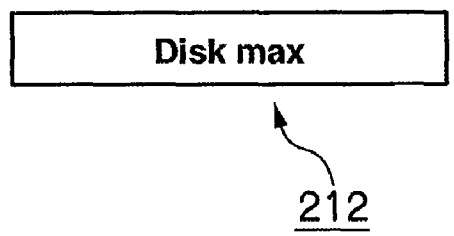
FIG. 10 is a chart showing a disk max management table according to the first embodiment.

The disk max management table 212 shown in FIG. 10 is a table retained by the server 2, and is used for managing the maximum number of times data is to be overwritten in the disk cache 22 when executing the erasure of data (indicated as "Disk max" in the drawings).

In this embodiment, there is a case where the server 2 sends overwrite data in file units toward the data to be erased in a synchronous or asynchronous timing, and a case where the server 2 sends overwrite data of a certain set pattern in file units toward the data to be erased.

The method of managing the disk max management table 212 will differ depending on the numerical value stored in the shredding count management table 100 for managing the overwrite count sent synchronously or asynchronously, or the numerical value stored in the shredding pattern management table 101 for managing the recognition of patterns.

In the foregoing synchronous case or asynchronous case, the maximum overwrite count managed by the shredding count management table 100 is stored in the disk max management table 212 each time the overwrite data is overwritten.

Meanwhile, in the case of pattern recognition, a numerical value (maximum overwrite count) obtained by adding 1 to the number sequence in the "overwrite count number" column 101A of the shredding pattern management table 101 is stored in the disk max table 212 as a matter of convenience in managing the number sequence of the shredding pattern management table 101 to start from zero.

(1-2-4) Disk Flush Management Table

Figure 11:
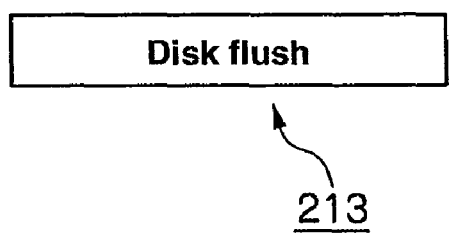
FIG. 11 is a chart showing a disk flush management table according to the first embodiment.

The disk flush management table 213 shown in FIG. 11 is a table retained by the server 2, and is used for managing whether overwrite data, which is arbitrary data, has been overwritten from the disk cache 22 to the controller cache 11.

Here, the term "flush" refers to the action of sending arbitrary data from an arbitrary location to an arbitrary location, and overwriting arbitrary data in an arbitrary location.

The disk flush management table 213 (indicated as "Disk flush" in the drawings) stores "0" when overwrite data has been sent from the disk cache 22 to the controller cache 11 and overwrite data has been written over the data to be erased in the controller cache 11 (hereinafter referred to as "flushed"), and stores "1" when such overwrite data has not been written over the data to be erased (hereinafter referred to as "not flushed").

(1-2-5) Disk Count Management Table

Figure 12:
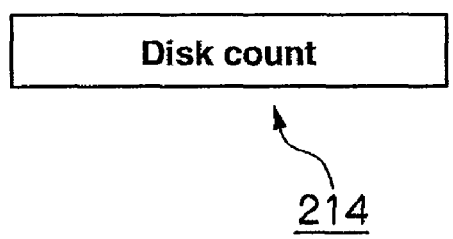
FIG. 12 is a chart showing a disk count management table according to the first embodiment.

The disk count management table 214 shown in FIG. 12 is a table retained by the server 2, and is used for managing the number of times data is to be overwritten in the disk cache 22 upon executing the erasure of data. Therefore, the numerical value (indicated as "Disk count" in the drawings) in the table is incremented by one each time the data to be erased in the disk cache 22 is overwritten.

(1-2-6) Shredding Count Management Table

The shredding count management table 100 shown in FIG. 13 is a table retained by the storage subsystem 4, and is used for managing the overwrite count showing the number of times overwrite data is to be sent in file units from the server 2.

The shredding count management table 100 is configured from a "synchronous/asynchronous" column 100A and an "overwrite count" column 100B.

The "synchronous/asynchronous" column 100A stores "0" when the overwrite data sent from the server 2 in a synchronous timing is to be written over the data to be erased of the hard disk drive HDD in a synchronous timing, and stores "1" when the overwrite data sent from the server 2 in an asynchronous timing is to be written over the data to be erased of the hard disk drive HDD in an asynchronous timing.

The "overwrite count" column 100B stores the maximum overwrite count issued from the server 2.

(1-2-7) Shredding Pattern Management Table

The shredding pattern management table 101 shown in FIG. 14 is a table retained by the storage subsystem 4, and is used for managing the overwrite data of a certain set pattern that is sent from the server 2 during an arbitrary overwrite count.

The shredding pattern management table 101 is configured from an "overwrite count number" column 101A and an "overwrite pattern" column 101B. The "overwrite count number" column 101A stores the overwrite count. However, since the number sequence is managed to start from zero, for instance, if the overwrite count is 3 times, numerical values "0" to "2" will be stored in the "overwrite count number" column 101A. The "overwrite pattern" column 101B stores the pattern information of the overwrite data.

(1-2-8) Subsystem-Side File Storage Location Management Table

The subsystem-side file storage location management table 102 shown in FIG. 15 is a table retained by the storage subsystem 4, and is used for managing the storage destination of the hard disk drive HDD storing files in the storage subsystem 4. The item columns 102A, 102B of this table are of the same configuration and subject matter as the server-side file storage location management table 211 described above, and the detailed explanation thereof is omitted.

(1-2-9) File Storage Location Cache Management Table

The file storage location cache management table 103 shown in FIG. 16 is a table retained by the storage subsystem 4, and is used for managing the relation between the storage destination in the disk cache 22 to which the data to be erased is written, and the storage destination in the controller cache 11 to which the data to be erased is written.

The file storage location cache management table 103 is configured from a "disk cache address" column 103A and a "controller cache address" column 103B.

The "disk cache address" column 103A stores the storage destination in the disk cache 22 to which the data to be erased is written.

The "controller cache address" column 103B stores the storage destination in the controller cache 11 to which the data to be erased is written.

(1-2-10) Controller Max Management Table

Figure 17:
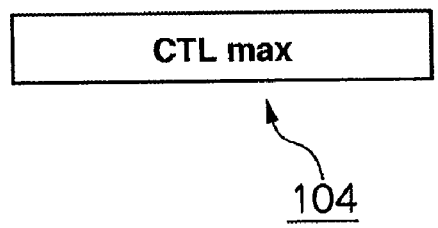
FIG. 17 is a chart showing a controller max management table according to the first embodiment.

The controller max management table 104 shown in FIG. 17 is a table retained by the storage subsystem 4, and is used for managing the maximum number of times data is to be overwritten in the controller cache 11 when executing the erasure of data (indicated as "CTL max" in the drawings). Therefore, the same count as the maximum overwrite count managed in the disk max management table 212 will be stored in this table.

(1-2-11) Controller Flush Management Table

Figure 18:
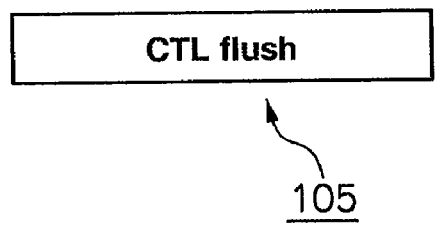
FIG. 18 is a chart showing a controller flush management table according to the first embodiment.

The controller flush management table 105 shown in FIG. 18 is a table retained by the storage subsystem 4, and is used for managing whether overwrite data has been overwritten from the controller cache 11 to the hard disk drive HDD.

The controller flush management table 105 (indicated as "CTL flush" in the drawings) stores "0" when data has been flushed from the controller cache 11 to the hard disk drive HDD and stores "1" when data has not been flushed.

(1-2-12) Controller Count Management Table

Figure 19:
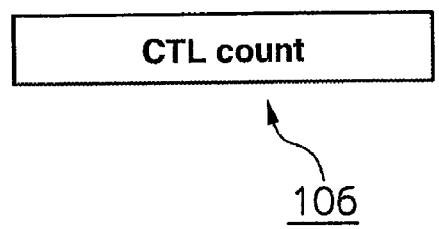
FIG. 19 is a chart showing a controller count management table according to the first embodiment.

The controller count management table 106 shown in FIG. 19 is a table retained by the storage subsystem 4, and is used for managing the number of times data is to be overwritten in the controller cache 11 upon executing the erasure of data (indicated as "CTL count" in the drawings). Therefore, the numerical value in the table is incremented by one each time the data to be erased in the controller cache 111 is overwritten.

(1-3) File Erasure Processing

File erasure processing for realizing the features of this embodiment is now explained.

(1-3-1) Flow of Overall File Erasure Processing

Foremost, the outline of file erasure processing to be performed between the server 2 and the storage subsystem 4 is explained.

Figure 20:
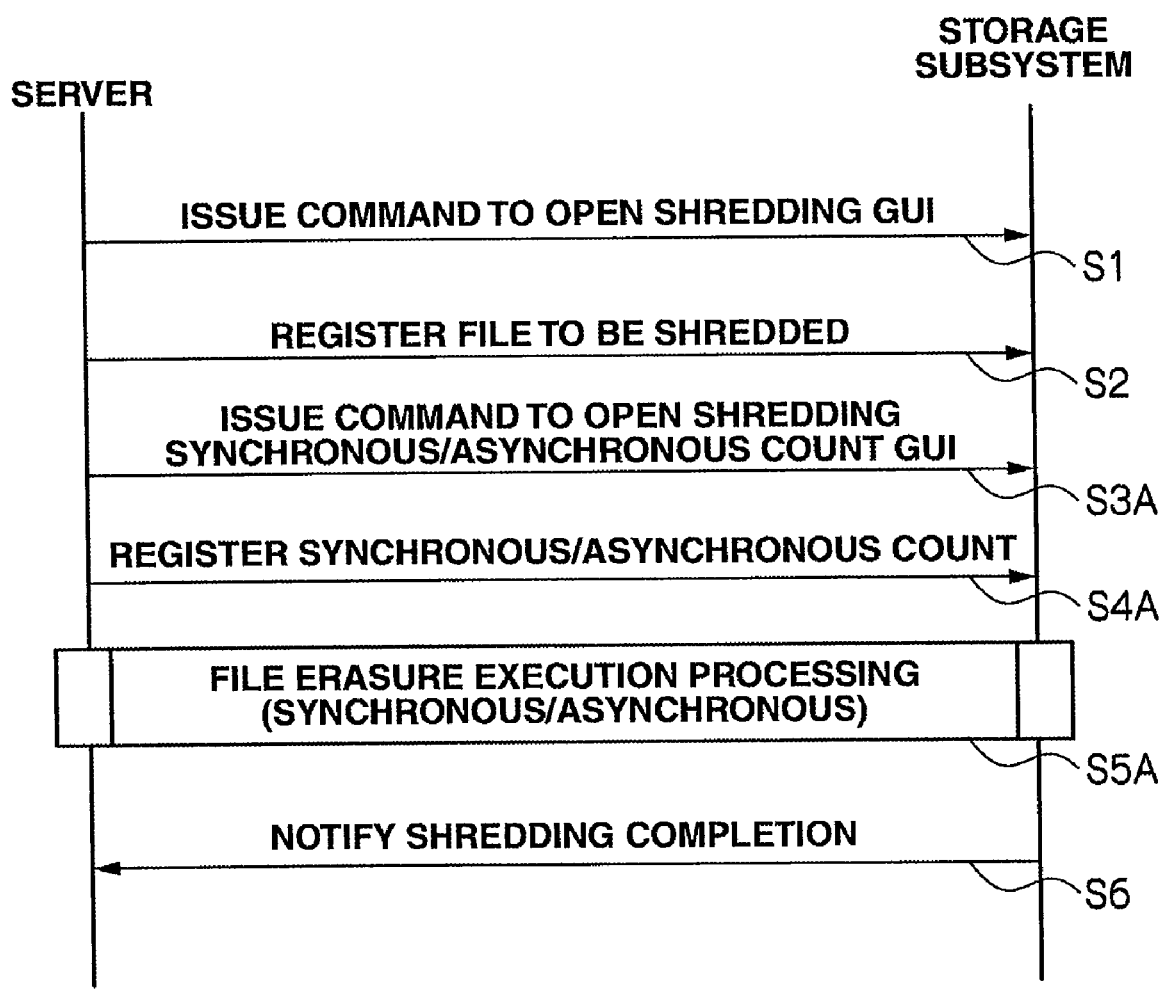
FIG. 20 is a sequence diagram for performing file erasure processing according to the first embodiment.
Figure 21:
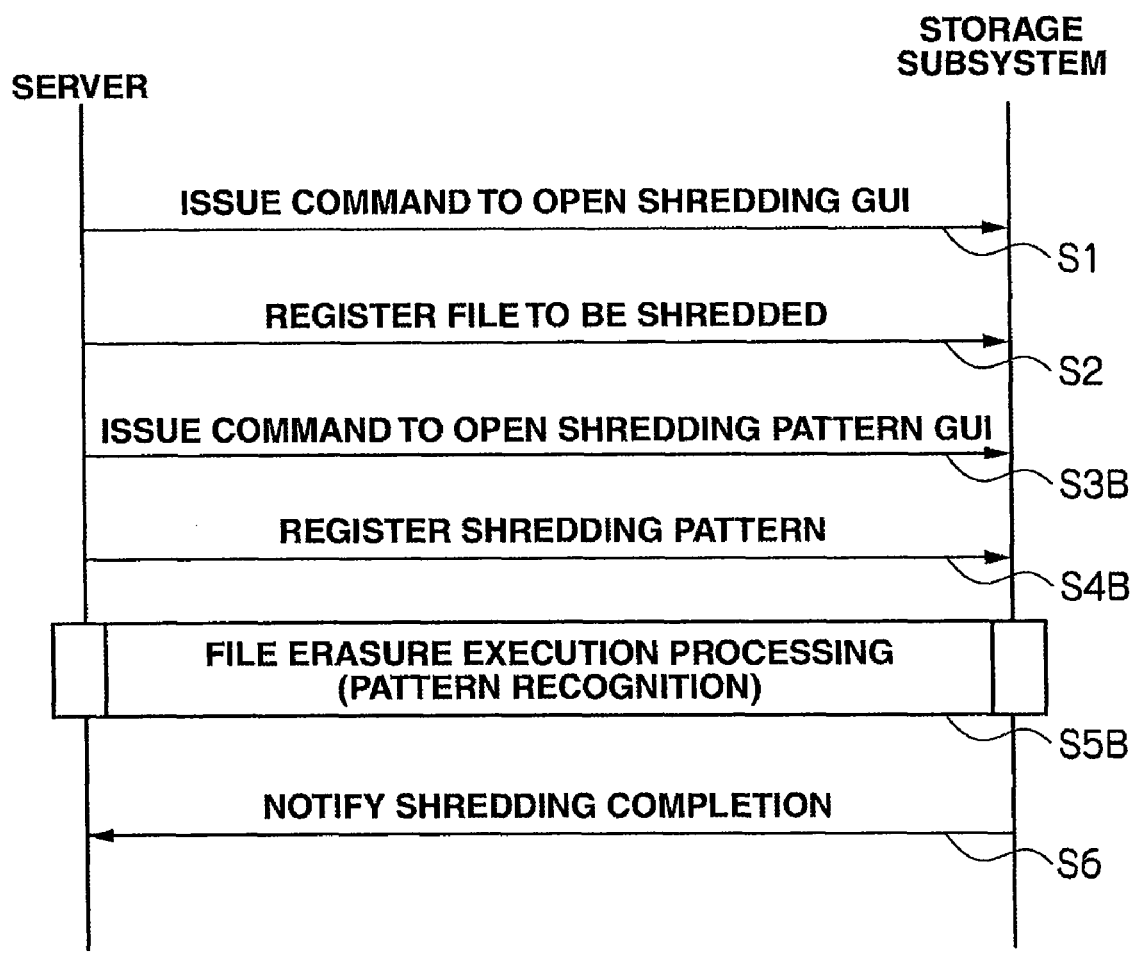
FIG. 21 is a sequence diagram for performing file erasure processing according to the first embodiment.

Specifically, as shown in FIG. 20 and FIG. 21, the server 2 commands the maintenance terminal in the storage subsystem 4 to open the shredding GUI (Graphical User Interface) (S1). Then, the maintenance termination 13 in the storage subsystem 4 uses the output device 135 to open the shredding GUI.

Figure 22:
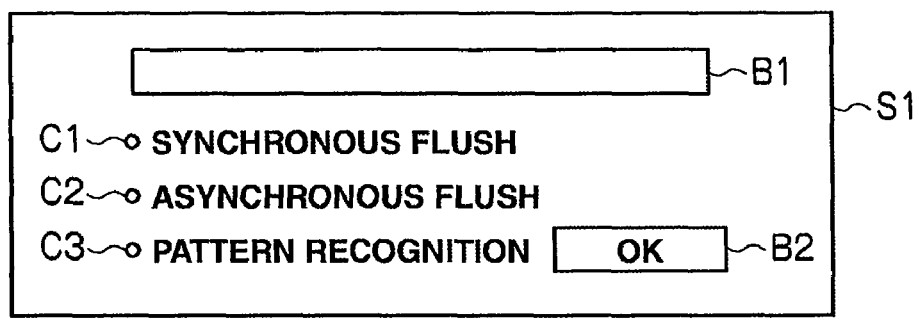
FIG. 22 is a screen diagram of a shredding GUI according to the first embodiment.

When the shredding GUI is opened, the screen S1 shown in FIG. 22 is output. The operator who issued the command from the server 2 manually inputs and registers the file name of the file to be deleted in the box shown on the screen S1 via remote operation (S2). The box B1 may also be provided with a pulldown function so that the operator can refer to the files by clicking the pulldown function. Here, the operator may select the file to be deleted among the files referred to by such operator.

When the operator registers the file name in the box B1, such operator then decides the erasing method by selecting one among a plurality of checkboxes C1 to C3 in order to select the method of erasing the file. The file erasing method may be selected from a method of erasing the file by synchronizing the server 2 and the storage subsystem 4, a method of erasing the file with the server 2 and the storage subsystem 4 in asynchronization, or a method of erasing the file by recognizing certain pattern data.

Figure 23:
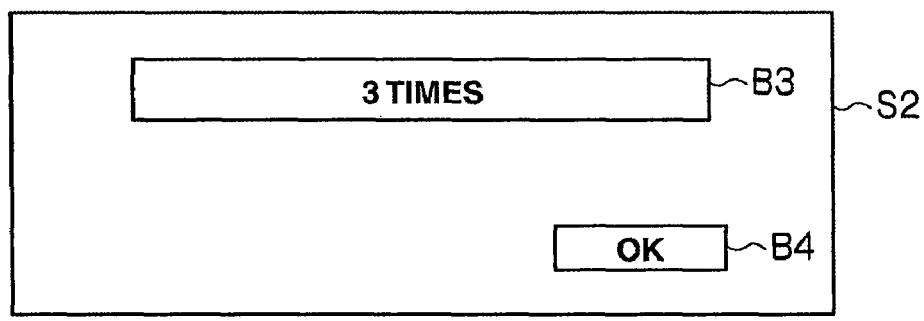
FIG. 23 is a screen diagram of a shredding synchronous/asynchronous count GUI according to the first embodiment.

When the operator selects the checkbox C1 or C2 as the erasing method for erasing the file with the server 2 and the storage subsystem 4 in synchronization or asynchronization and clicks the OK button B2, the server 2 issues a command to open the shredding synchronous/asynchronous count GUI (S3A of FIG. 20). Then, the storage subsystem 4 outputs the screen S2 shown in FIG. 23.

As a result of the operator selecting the file name, the correlation of the disk cache 22, the controller cache 11 and the hard disk drive HDD in relation to the file to be erased can be known based on the file name management table 210, the server-side file storage location management table 211, the subsystem-side file storage location management table 102, and the file storage location cache management table 103.

Subsequently, the operator inputs the number of times the overwrite data is to be written over the data in the file to be deleted in the box B3 shown on the screen S2. The box B3 may also be provided with a pulldown function so that the operator can select the overwrite count.

When the operator inputs the overwrite count in the box B3 and then clicks the OK button B4, the overwrite count to be executed synchronously or asynchronously is registered (S4A of FIG. 20). The initialization process is thereby completed. As a result of this registration, information will be registered in the shredding count management table 100, the disk max management table 212, and the controller max management table 104.

Figure 24:
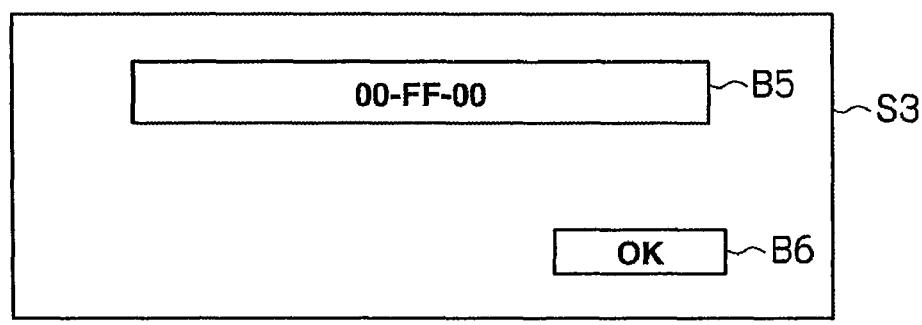
FIG. 24 is a screen diagram of a shredding pattern GUI according to the first embodiment.

Meanwhile, when the operator selects the checkbox C3 as the erasing method for erasing the file by recognizing certain pattern data and clicks the OK button B2, the server 2 issues a command to open the shredding pattern GUI (S3B of FIG. 21). Then, the storage subsystem 4 outputs the screen S3 shown in FIG. 24.

When the screen S3 is opened, the operator inputs the pattern of overwrite data in the box B5 shown on the screen S3. For instance, if the operator is to input the pattern of overwrite data with the overwrite count as 3 times, the operator would configure the setting such that the overwrite data of "00" is overwritten in the first overwriting process, the overwrite data of "FF" is overwritten in the second overwriting process, and the overwrite data of "00" is overwritten in the third overwriting process.

When the operator inputs the pattern of overwrite data in the box B5 and then clicks the OK button B6, the pattern of overwrite data is registered (S4B of FIG. 21). The initialization process is thereby completed.

After initialization, the server 2 and the storage subsystem 4 jointly execute file erasure execution processing (S5A of FIG. 20, S5B of FIG. 21). The storage subsystem 4 thereafter notifies the server 2 that the file erasure execution processing is complete, and then ends the file erasure processing (S6).

(1-3-2) Synchronous or Asynchronous File Erasure Execution Processing

In this embodiment, since there is file erasure execution processing where the server 2 sends and overwrites overwrite data in file units toward the data to be erased in a synchronous or asynchronous timing (hereinafter referred to as a "synchronous case" or an "asynchronous case"), and file erasure execution processing where the server 2 sends and overwrites overwrite data of a certain set pattern in file units toward the data to be erased (hereinafter referred to as a "pattern recognition case"), the processing to be performed at step S5A and the processing to be performed at step S5B will differ depending on the administrator's setting.

The file erasure execution processing according to a synchronous case or an asynchronous case is explained below. The file erasure execution processing is executed by the CPU 20 of the server 2 and the controller 7 of the storage subsystem 4 based on the synchronous flush program 215 or the asynchronous flush program 216.

Figure 25:
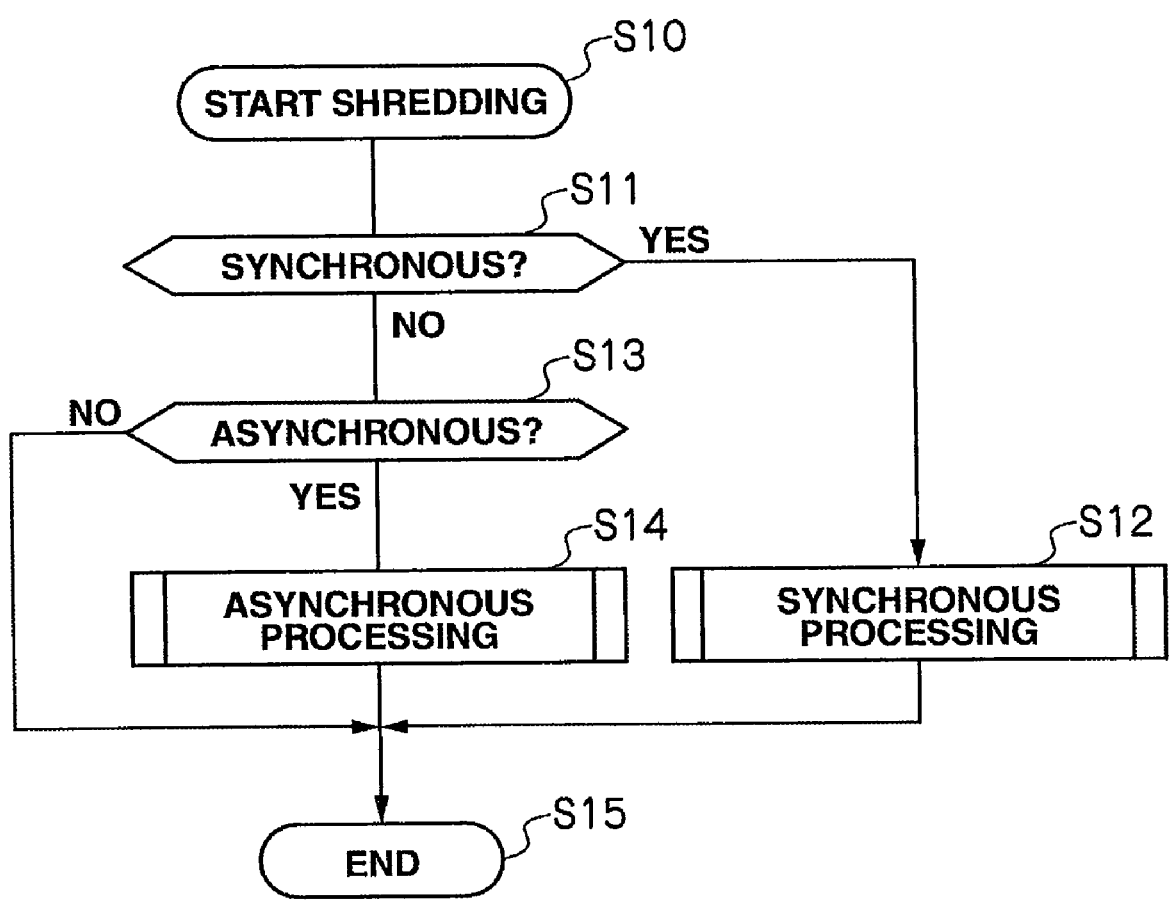
FIG. 25 is a flowchart of file erasure execution processing according to the first embodiment.

As shown in FIG. 25, foremost, when the registration of initialization is complete, the file erasure execution processing is started by the CPU 20 of the server 2 sending data of the registered contents to the substorage system 4 (S10).

Subsequently, the controller 7 of the storage subsystem 4 determines whether to send the overwrite data toward the data to be erased in a synchronous timing based on the data of the received registered contents (S11). When the controller 7 of the storage subsystem 4 determines that the sending of overwrite data toward the data to be erased is registered in a synchronous timing (S11: YES), the server 2 and the storage subsystem 4 jointly execute synchronous processing (S12). Details concerning the synchronous processing will be described later. When the server 2 and the storage subsystem 4 complete the execution of the synchronous processing, the server 2 and the storage subsystem 4 thereby end the file erasure execution processing.

Meanwhile, when the controller 7 of the storage subsystem 4 determines that the sending of the overwrite data toward the data to be erased is not registered in a synchronous timing based on the data of the received registered contents (S11: NO), it determines whether the sending of overwrite data toward the data to be erased is registered in an asynchronous timing (S13). When the controller 7 of the storage subsystem 4 determines that the sending of overwrite data toward the data to be erased is registered in an asynchronous timing (S13: YES), the server 2 and the storage subsystem 4 jointly execute asynchronous processing (S14). Details concerning the asynchronous processing will be described later. When the server 2 and the storage subsystem 4 complete the execution of the asynchronous processing, the server 2 and the storage subsystem 4 thereby end the file erasure execution processing (S15).

When the storage subsystem 4 determines that the sending of overwrite data toward the data to be erased is not registered in an asynchronous timing (S13: NO), it directly ends the file erasure execution processing (S15).

(1-3-2-1) Synchronous Processing

The synchronous processing at step S12 is now explained in detail. The synchronous processing is executed by the CPU 20 of the server 2 based on the synchronous flush program 215, and executed by the controller 7 of the storage subsystem 4 based on the synchronous flush program 107.

Figure 26:
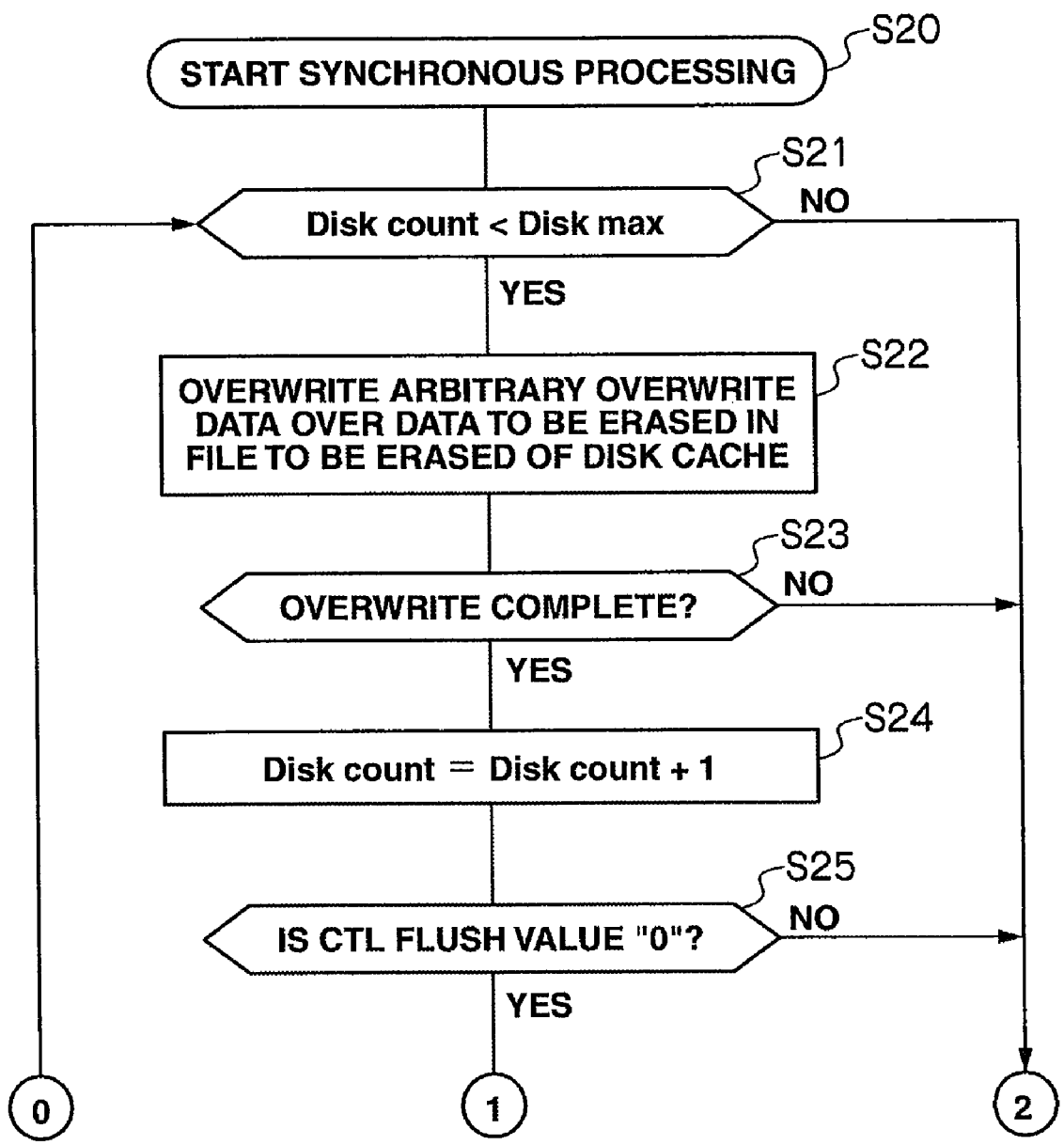
FIG. 26 is a flowchart of synchronous processing according to the first embodiment.
Figure 27:
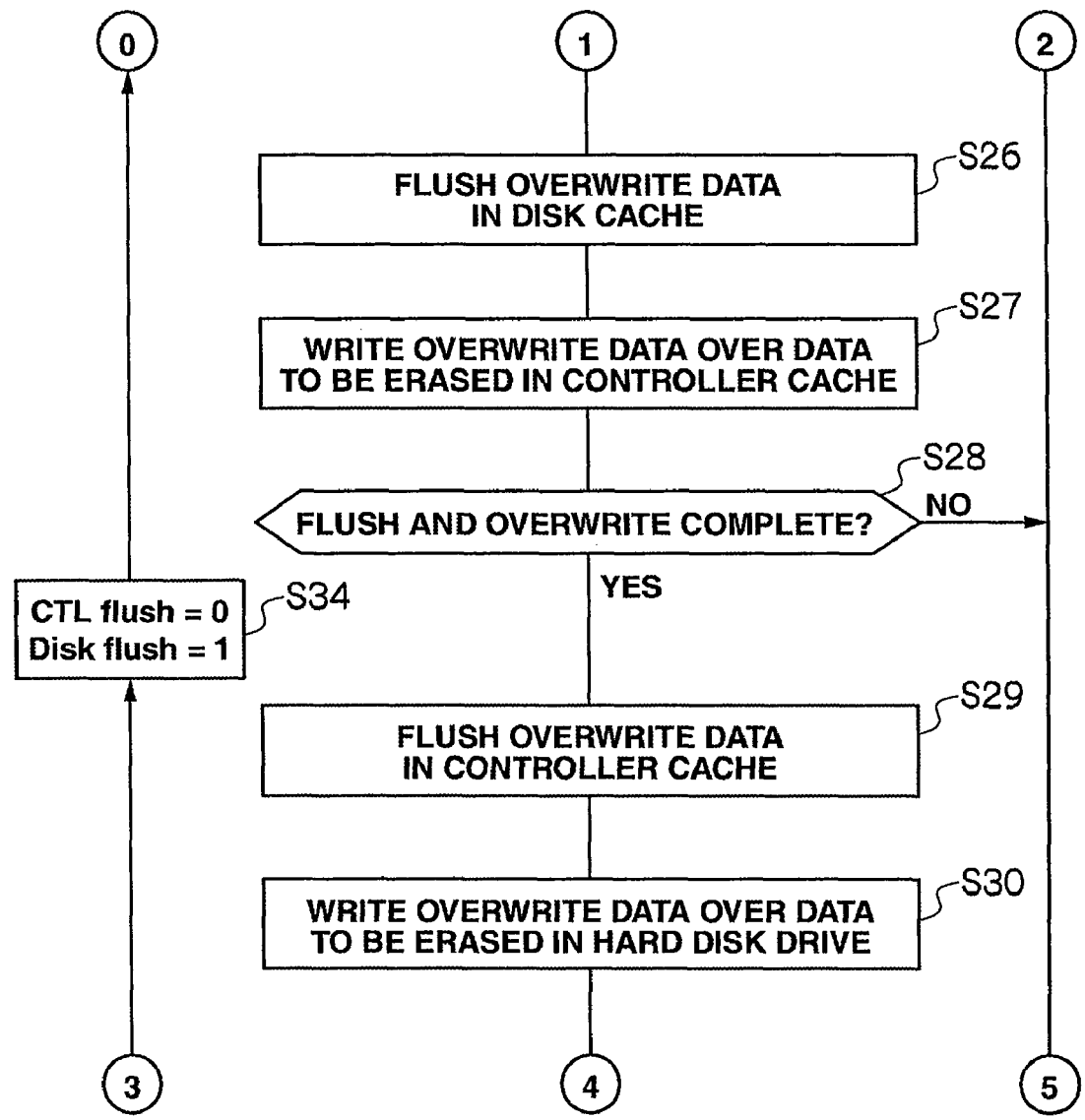
FIG. 27 is a flowchart of synchronous processing according to the first embodiment.
Figure 28:
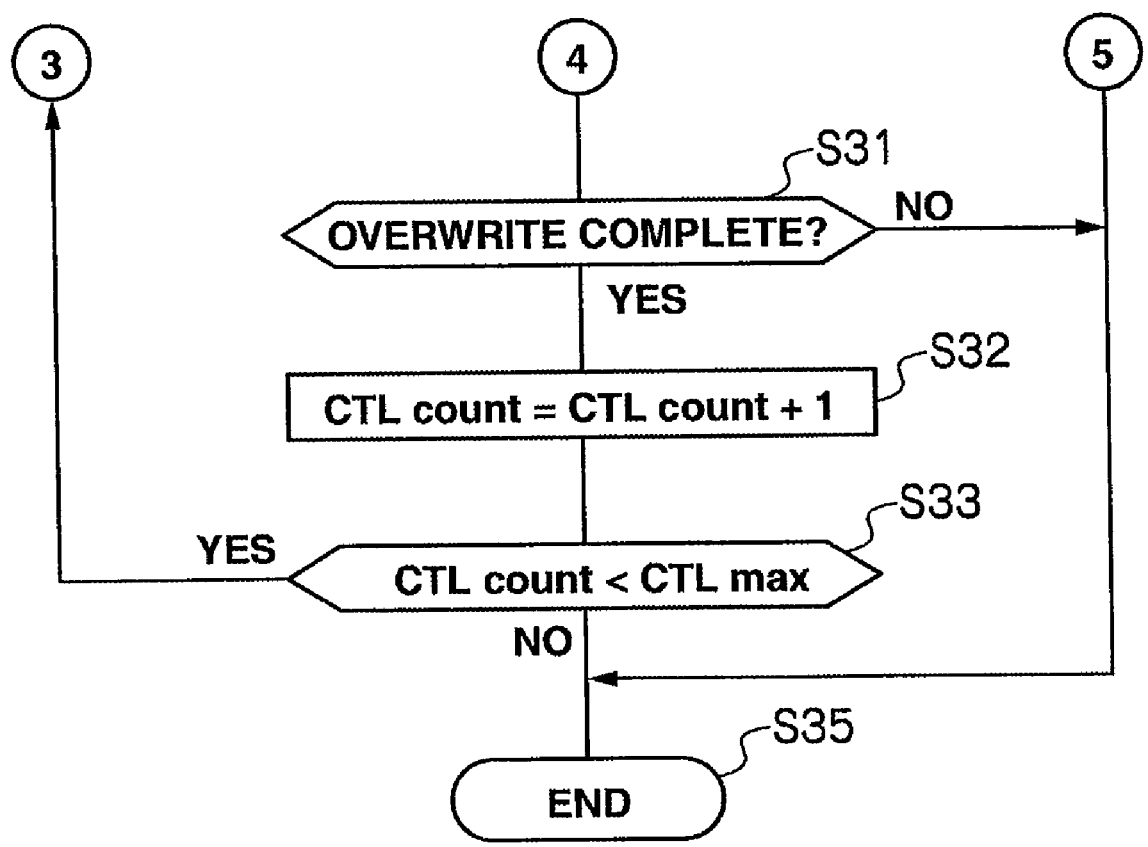
FIG. 28 is a flowchart of synchronous processing according to the first embodiment.

As shown in FIG. 26 to FIG. 28, when the controller 7 of the storage subsystem 4 determines that the overwrite data is to be sent toward the data to be erased in a synchronous timing based on the data of the received registered contents, the server 2 and the storage subsystem 4 jointly start the synchronous processing (S20).

Foremost, the CPU 20 of the server 2 refers to the disk max management table 212 and the disk count management table 214 and compares the current overwrite count (indicated as "Disk count" in the drawings) and the maximum overwrite count (indicated as "Disk max" in the drawings) (S21). If the current overwrite count less than the maximum overwrite count (S21: YES), the CPU 20 of the server 2 writes arbitrary overwrite data over the data to be erased in the file to be erased of the disk cache 22 (S22). The term "arbitrary overwrite data" refers to data to be used for erasing the data to be erased.

The CPU 20 of the server 2 determines whether the overwriting process is complete (S23). When the CPU 20 of the server 2 determines that the overwriting process is complete (S23: YES), it increments the numerical value in the disk count management table 214 by one (S24).

Subsequently, the CPU 20 of the server 2 issues a confirmation command to the controller cache 11 in the storage subsystem 4, and determines whether the numerical value in the controller flush management table 105 is zero (flushed) (S25). In other words, the CPU 20 of the server 2 issues a command for confirming whether the overwrite data in the controller cache 11 has been flushed and written over the data to be erased in the hard disk drive HDD. This processing must be executed for the second overwrite processing onward.

When the CPU 20 of the server 2 determines that the numerical value in the controller flush management table 105 is zero (flushed) (S25: YES), it flushes the overwrite data in the disk cache 22 to the storage subsystem 4 side (S26).

The controller 7 of the storage subsystem 4 writes the received overwrite data over the data to be erased in the controller cache 11 (S27). For the second overwriting process onward, the second overwrite data is written over the tentatively erased data in which the first overwrite data was written over the data to be erased. Here, the numerical value in the disk flush management table 213 is updated to zero (flushed).

The controller 7 of the storage subsystem 4 determines whether the flushing and overwriting of the area storing the data to be erased in the controller cache 11 are complete (S28). When the controller 7 of the storage subsystem 4 determines that the flushing and overwriting are complete (S28: YES), it flushes the overwrite data in the controller cache 11 (S29), and writes overwrite data over the data to be erased in the hard disk drive HDD (S30).

The controller 7 of the storage subsystem 4 determines whether the overwriting of the area storing the data to be erased in the hard disk drive HDD is complete (S31). When controller 7 of the storage subsystem 4 determines that the overwriting is complete (S31: YES), it increments the numerical value in the controller count management table 106 by one (S32).

The controller 7 of the storage subsystem 4 refers to the controller max management table 104 and the controller count management table 106 and compares the current overwrite count (indicated as "CTL count" in the drawings) and the maximum overwrite count (indicated as "CTL max" in the drawings) (S33).

If the current overwrite count is less than the maximum overwrite count (S33: YES), the controller 7 of the storage subsystem 4 updates the numerical value in the controller flush management table 105 to zero (flushed), and, when the CPU 20 of the server 2 returns the numerical value in the disk flush management table 213 to 1 (not flushed) (S34), the controller 7 of the storage subsystem 4 returns to step S21 once again, and executes the subsequent overwrite synchronous processing.

Meanwhile, if the current overwrite count is not less than the maximum overwrite count (S33: NO), the controller 7 of the storage subsystem 4 ends the synchronous processing since this means that the controller 7 of the storage subsystem 4 has executed the set overwrite count (S35).

When the CPU 20 of the server 2 determines at step S21, step S23 or step S25 that the current overwrite count is not less than the maximum overwrite count (S21: NO), or determines that the overwriting process is not complete (S23: NO), or determines that the numerical value in the controller flush management table 105 is 1 (not flushed) and not zero (flushed) (S25: NO), it ends the synchronous processing as being abnormal (S35).

When the controller 7 of the storage subsystem 4 determines at step S28 or step S31 that the overwriting process is not complete (S28: N0, S31: NO), it ends the synchronous processing as being abnormal (S35).

(1-3-2-2) Synchronous Processing

The asynchronous processing at step S14 is now explained in detail. The asynchronous processing is executed by the CPU 20 of the server 2 based on the asynchronous flush program 216, and executed by the controller 7 of the storage subsystem 4 based on the asynchronous flush program 108.

Figure 29:
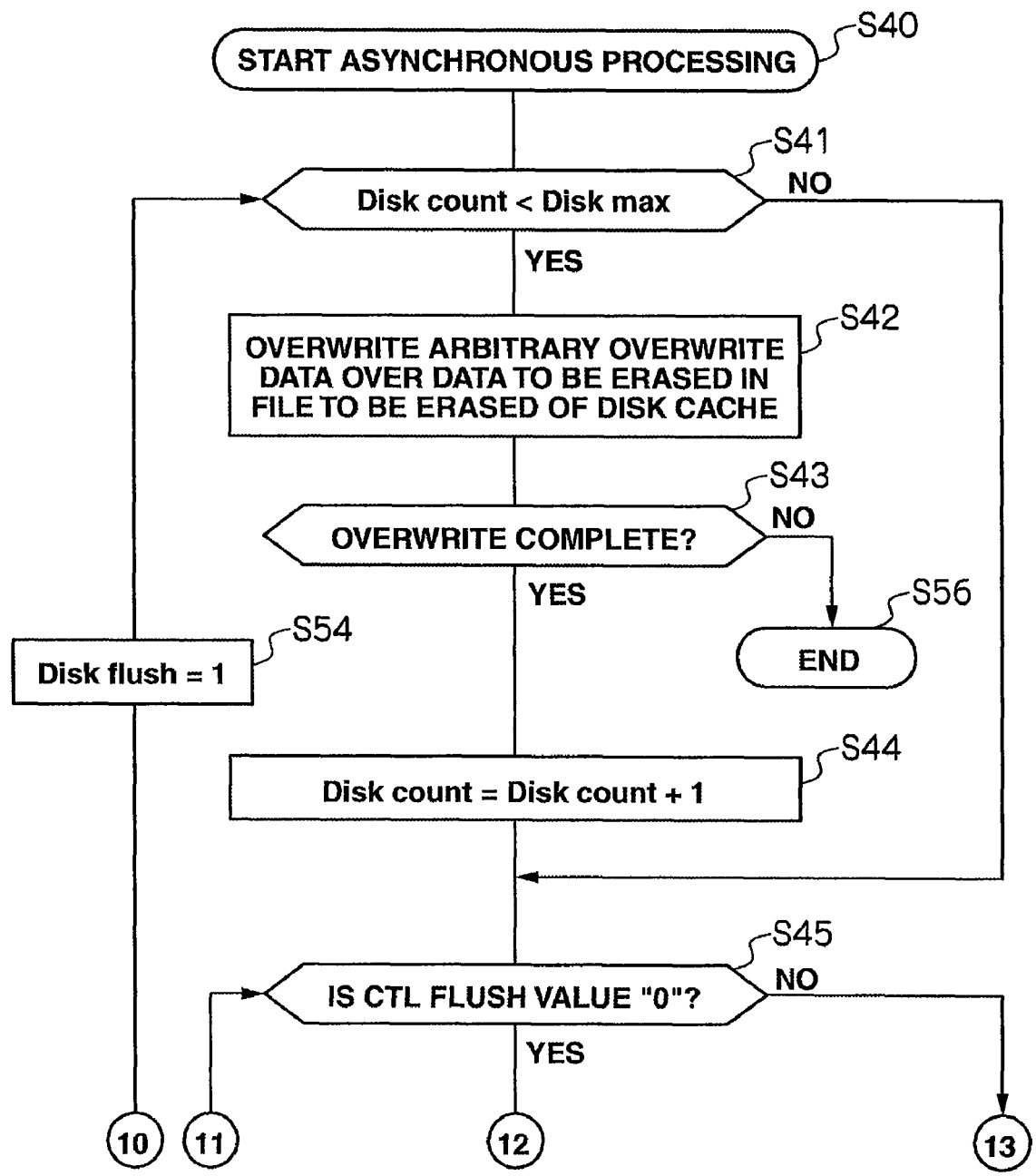
FIG. 29 is a flowchart of asynchronous processing according to the first embodiment.
Figure 30:
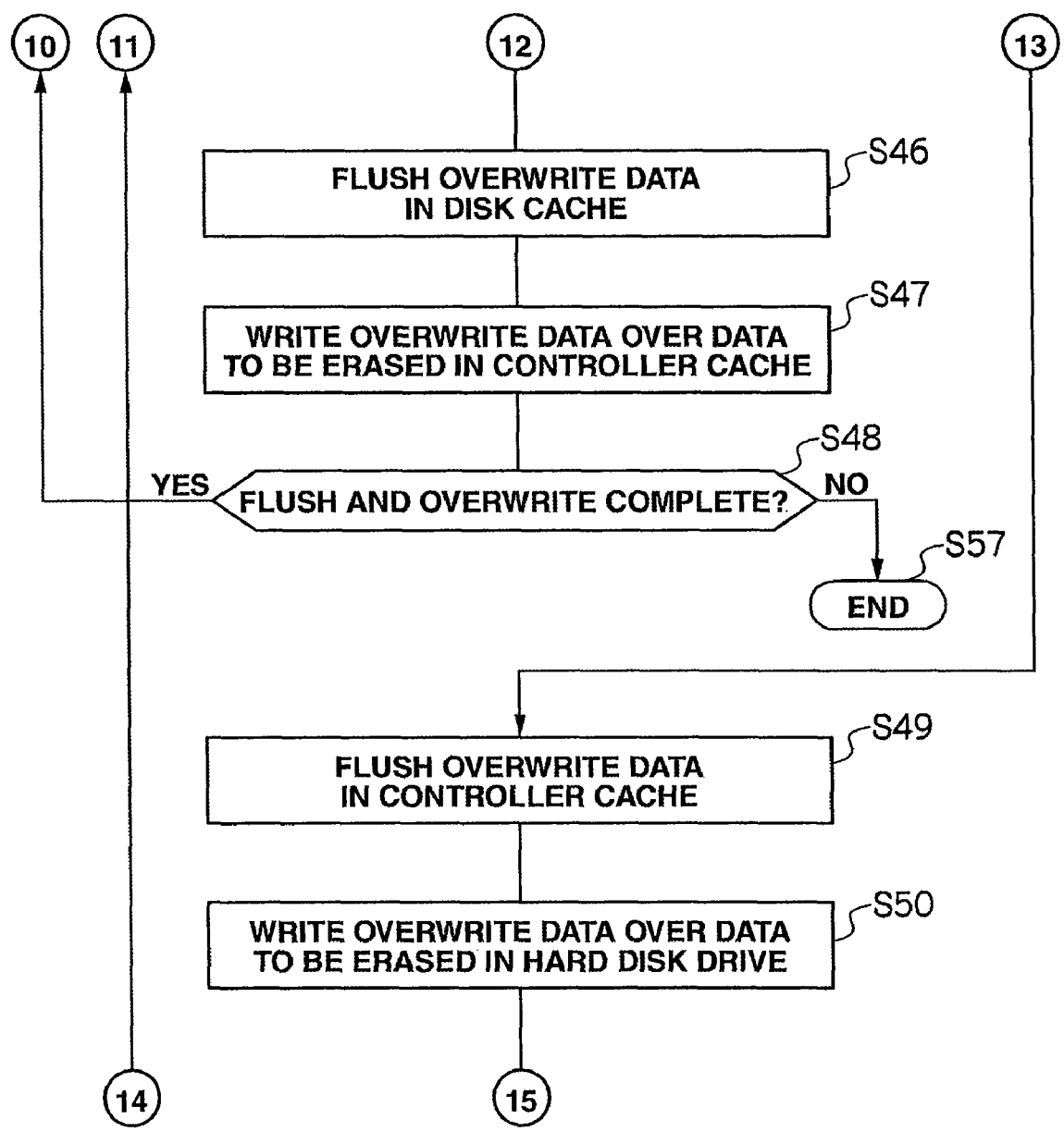
FIG. 30 is a flowchart of asynchronous processing according to the first embodiment.
Figure 31:
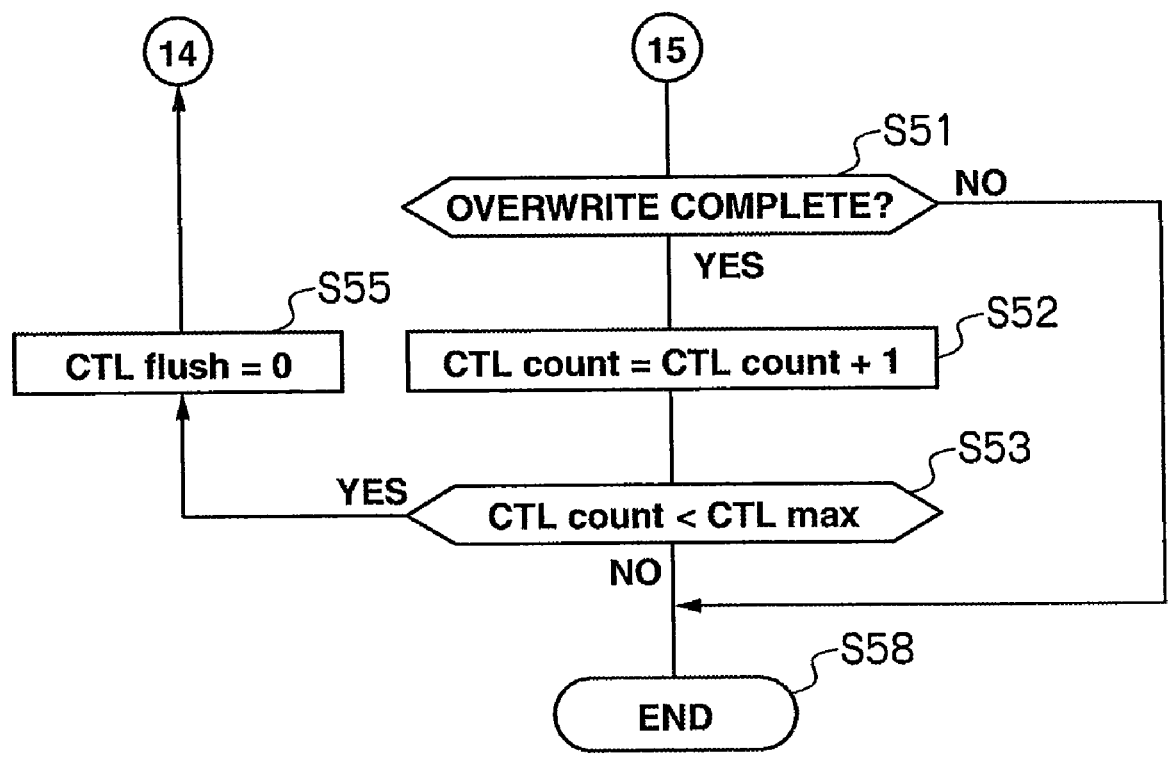
FIG. 31 is a flowchart of asynchronous processing according to the first embodiment.

As shown in FIG. 29 to FIG. 31, when the controller 7 of the storage subsystem 4 determines that the overwrite data is to be sent toward the data to be erased in an asynchronous timing based on the data of the received registered contents, the server 2 and the storage subsystem 4 jointly start the asynchronous processing (S40).

Foremost, the CPU 20 of the server 2 refers to the disk max management table 212 and the disk count management table 214 and compares the current overwrite count (indicated as "Disk count" in the drawings) and the maximum overwrite count (indicated as "Disk max" in the drawings) (S41). If the current overwrite count is less than the maximum overwrite count (S41: YES), the CPU 20 of the server 2 writes arbitrary overwrite data over the data to be erased in the file to be erased of the disk cache 22 (S42).

The CPU 20 of the server 2 determines whether the overwriting process is complete (S43). When the CPU 20 of the server 2 determines that the overwriting process is complete (S43: YES), it increments the numerical value in the disk count management table 214 by one (S44).

When the CPU 20 of the server 2 determines that the current overwrite count is not less than the maximum overwrite count (S41: NO), or increments the disk count by one as described above (S44), the CPU 20 of the server 2 issues a confirmation command to the controller cache 11 in the storage subsystem 4, and determines whether the numerical value in the controller flush management table 105 is zero (flushed) (S45). This processing must be executed for the second overwrite processing onward.

When the CPU 20 of the server 2 determines that the numerical value in the controller flush management table 105 is zero (flushed) (S45: YES), it flushes the overwrite data in the disk cache 22 to the area storing the data to be erased in the controller cache 11 (S46).

Here, this processing is conducted by the server 2 at an arbitrary timing while giving consideration to the load status and the like in the server 2 since it is asynchronous processing.

The controller 7 of the storage subsystem 4 writes the overwrite data sent from the server 2 over the data to be erased in the controller cache 11 (S47). For the second overwriting process onward, the second overwrite data is written over the tentatively erased data in which the first overwrite data was written over the data to be erased.

The controller 7 of the storage subsystem 4 determines whether the flushing and overwriting of the area storing the data to be erased in the controller cache 11 are complete (S48). When the controller 7 of the storage subsystem 4 determines that the flushing and overwriting are complete (S48: YES), it returns the numerical value in the disk flush management table 213 to 1 (not flushed) (S54), returns to step S41 once again, and executes the subsequent overwrite synchronous processing.

Subsequently, when the CPU 20 of the server 2 at step S45 determines that the numerical value in the controller flush management table 105 has not been flushed (S45: NO), it issues a command to foremost flush the overwrite data currently remaining in the controller cache 11 since the overwrite data in the disk cache 22 cannot be sent to the storage subsystem 4 side.

Then, the controller 7 of the storage subsystem 4 flushes the overwrite data in the controller cache 11 (S49), and writes the overwrite data over the data to be erased in the hard disk drive HDD (S50).

Here, in this processing, flushing is performed by the controller 7 of the storage subsystem 4 at an arbitrary time while giving consideration to the load status and the like in the subsystem 4 since it is asynchronous processing.

The controller 7 of the storage subsystem 4 determines whether the overwriting of the area storing the data to be erased in the hard disk drive HDD is complete (S51). When the controller 7 of the storage subsystem 4 determines that the overwriting is complete (S51: YES), it increments the numerical value in the controller count management table 106 by one (S52).

The controller 7 of the storage subsystem 4 refers to the controller max management table 104 and the controller count management table 106 and compares the current overwrite count (indicated as "CTL count" in the drawings) and the maximum overwrite count (indicated as "CTL max" in the drawings) (S53). If the current overwrite count is less than the maximum overwrite count (S53: YES), the controller 7 of the storage subsystem 4 updates the numerical value in the controller flush management table 105 to zero (flushed) (S55), returns to step S45, and executes processing for sending the overwrite data in the disk cache 22 to the storage subsystem 4 side.

Meanwhile, if the current overwrite count is not less than the maximum overwrite count (S53: NO), the controller 7 of the storage subsystem 4 ends the asynchronous processing since this means that the controller 7 of the storage subsystem 4 has executed the set overwrite count (S58).

When the CPU 20 of the server 2 determines at step S43 or step S48 that the overwriting process is not complete (S43: N0, S48: NO), it ends the asynchronous processing as being abnormal (S56, S57).

(1-3-3) File Erasure Execution Processing Based on Pattern Recognition

The file erasure execution processing based on a case of sending, at step S5B, overwrite data of a certain set pattern in file units toward the data to be erased (hereinafter referred to as a "pattern recognition case") is now explained. The file erasure execution processing based on pattern recognition is executed by the CPU 20 of the server 2 based on the pattern recognition program 217, and executed by the controller 7 of the storage subsystem 4 based on the pattern recognition program 109.

Figure 32:
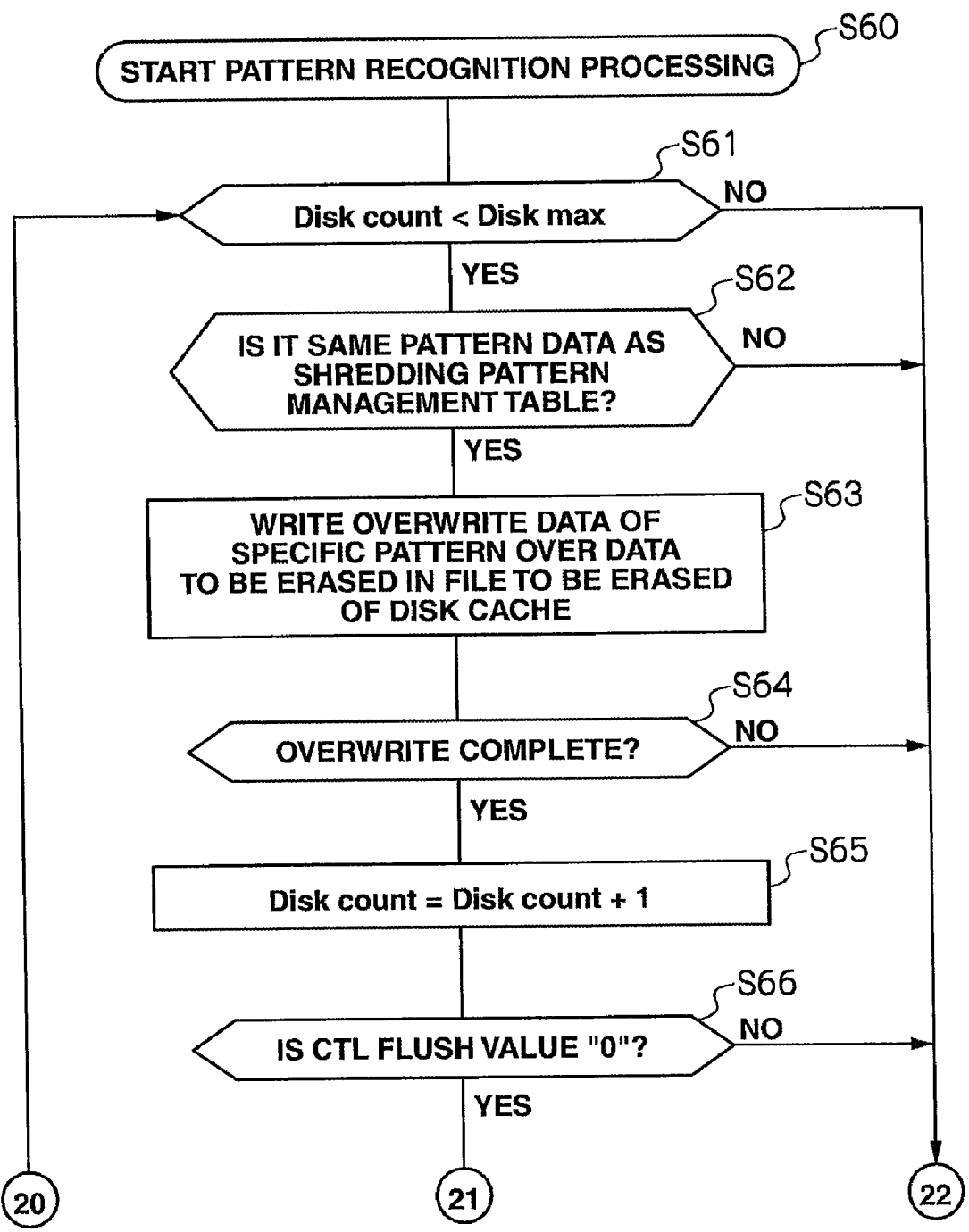
FIG. 32 is a flowchart of pattern recognition processing according to the first embodiment.
Figure 33:
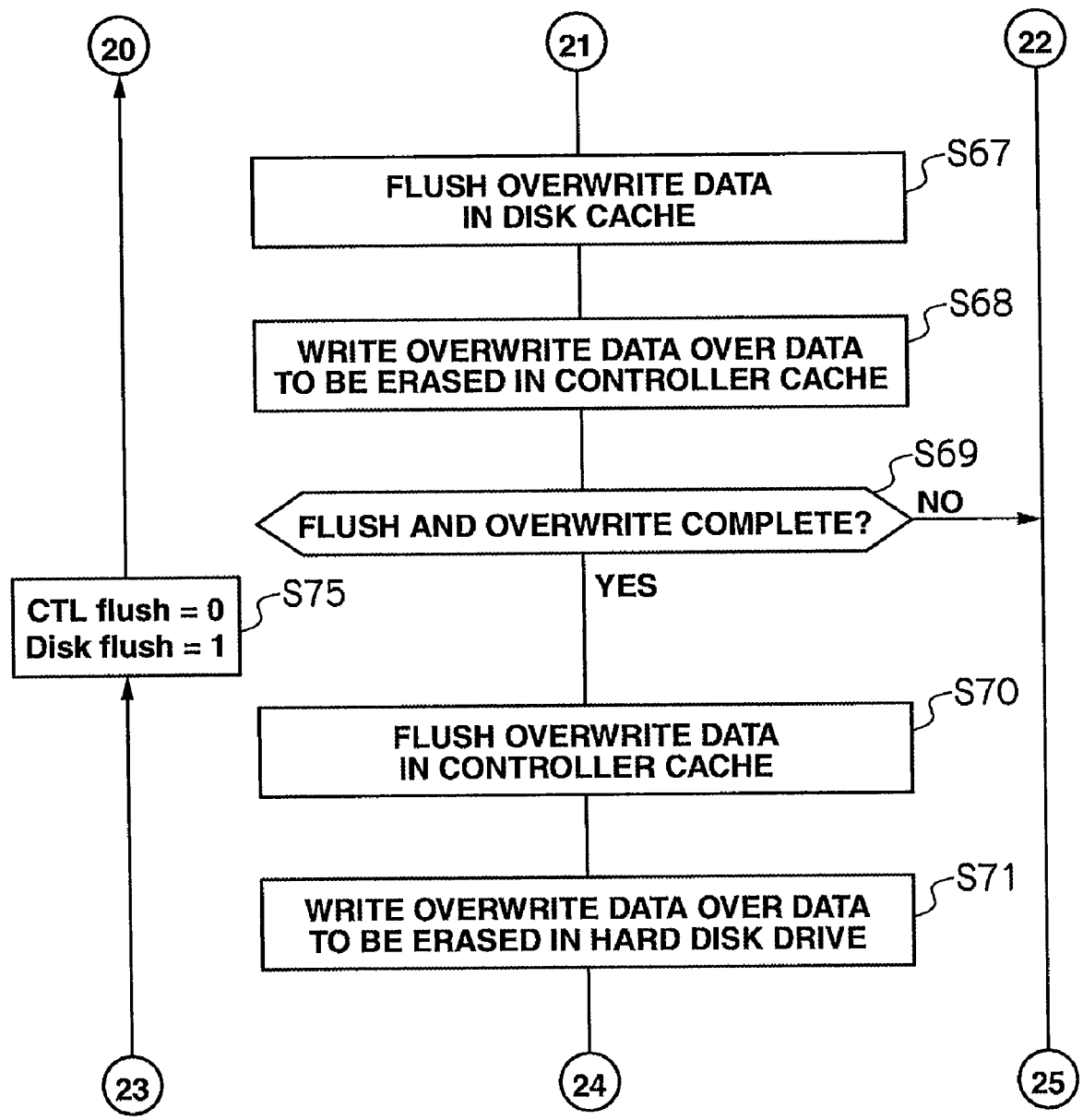
FIG. 33 is a flowchart of pattern recognition processing according to the first embodiment.
Figure 34:
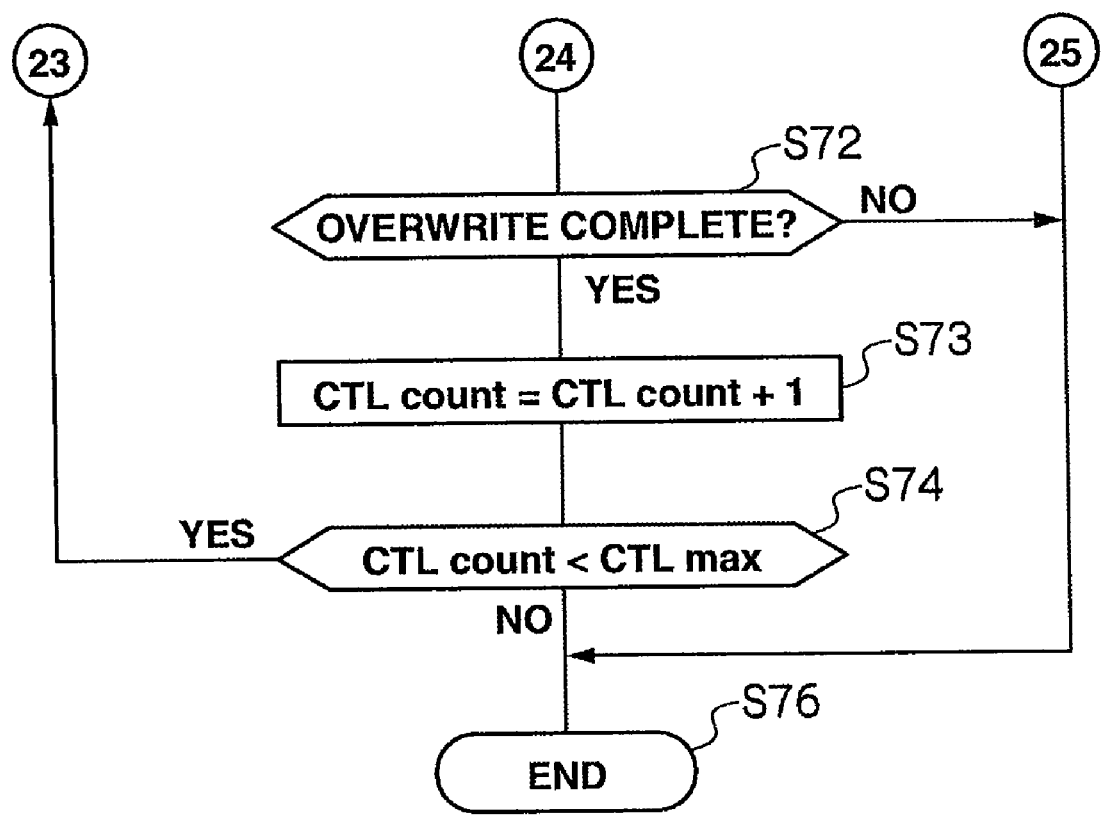
FIG. 34 is a flowchart of pattern recognition processing according to the first embodiment.

As shown in FIG. 32 to FIG. 34, when the controller 7 of the storage subsystem 4 determines to write the registered pattern data as overwrite data over the data to be erased based on the data of the received registered contents, the server 2 and the storage subsystem 4 jointly start the pattern recognition processing (S60).

Foremost, the CPU 20 of the server 2 refers to the disk max management table 212 and the disk count management table 214 and compares the current overwrite count (indicated as "Disk count" in the drawings) and the maximum overwrite count (indicated as "Disk max" in the drawings) (S61). If the current overwrite count is less than the maximum overwrite count (S61: YES), the CPU 20 of the server 2 determines whether the data to be overwritten during the execution of an arbitrary overwrite count is the same pattern data as the pattern data registered in the shredding pattern management table 101 (S62).

When the CPU 20 of the server 2 determines that the data to be overwritten is the same pattern data as the pattern data registered in the shredding pattern management table 101 (S62: YES), it writes overwrite data of a specific pattern over the data to be erased in the file to be erased of the disk cache (S63).

Subsequently, the CPU 20 of the server 2 or the controller 7 of the storage subsystem 4 executes the processing from step S64 to step S76 according to the same routine as the processing from step S23 to step S35 explained with reference to the synchronous processing (FIG. 26 to FIG. 28).

(1-3) Effect of First Embodiment

According to the present embodiment, data in the storage system is managed in file units. Thus, in all cases of synchronous processing, asynchronous processing, and pattern recognition processing, the overwrite command that is issued a plurality of times from the server 2 can be reliably reflected in the disk cache, the controller cache and the hard disk drive. Thereby, the data to be erased stored in the respective areas can be overwritten reliably, and the data to be erased can be erased in file units. According to this embodiment, it is possible to reliably prevent information leakage.

(2) Second Embodiment (2-1) Configuration of Storage System

Figure 35:
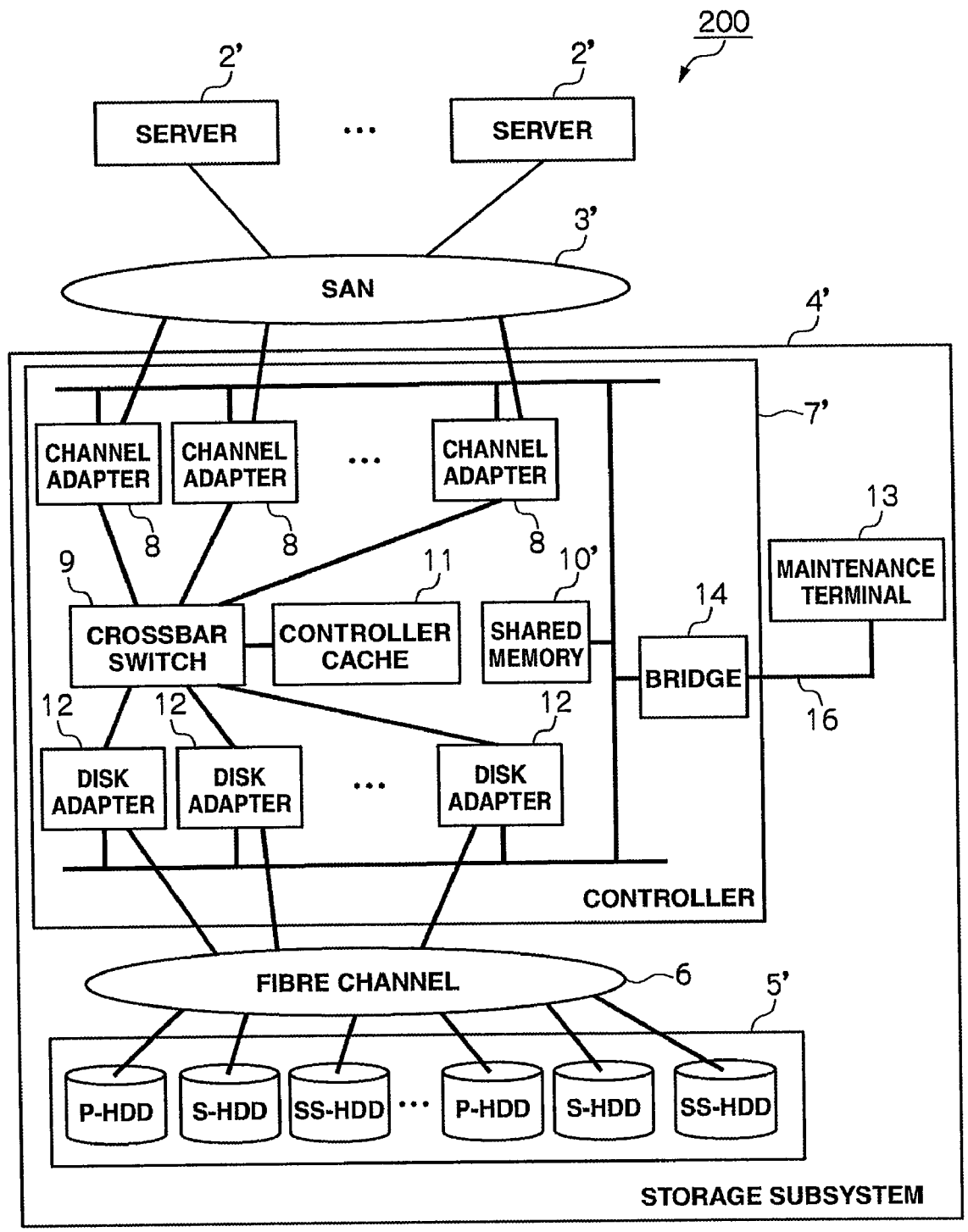
FIG. 35 is a block diagram showing the overall configuration of a storage system according to the second embodiment.

FIG. 35 shows the overall storage system 200 according to the present embodiment.

The storage system 200 of this embodiment, as shown in FIG. 35 in which the same reference numerals are given to the components corresponding to those of FIG. 1, is configured by pair-configuring the plurality of hard disk drives HDD in the storage subsystem 4' explained in the first embodiment. In other words, the storage system 200 sets the hard disk drive HDD to directly receive the overwrite data from the server 2' and write such overwrite data over the data to be erased as a primary hard disk drive (this is hereinafter referred to as a "primary physical disk") P-HDD. In addition, the storage system 200 sets this primary physical disk P-HDD as the copy source, and sets the pair-configured secondary hard disk drive (hereinafter referred to as a "secondary physical disk")

S-HDD as the copy destination. The storage system 200 also sets this secondary physical disk S-HDD as the copy source, and sets the pair-configured additional secondary hard disk drive (hereinafter referred to as a "additional secondary physical disk") SS-HDD as the copy destination.

The remaining configuration is the same as the configuration of the storage system 1 according to the first embodiment, and the detailed description thereof is omitted. In addition, the same reference numeral is given to the same component as in the first embodiment.

(2-2) Subsystem Internal File Storage Location Replication Management Table 150

Figure 36:
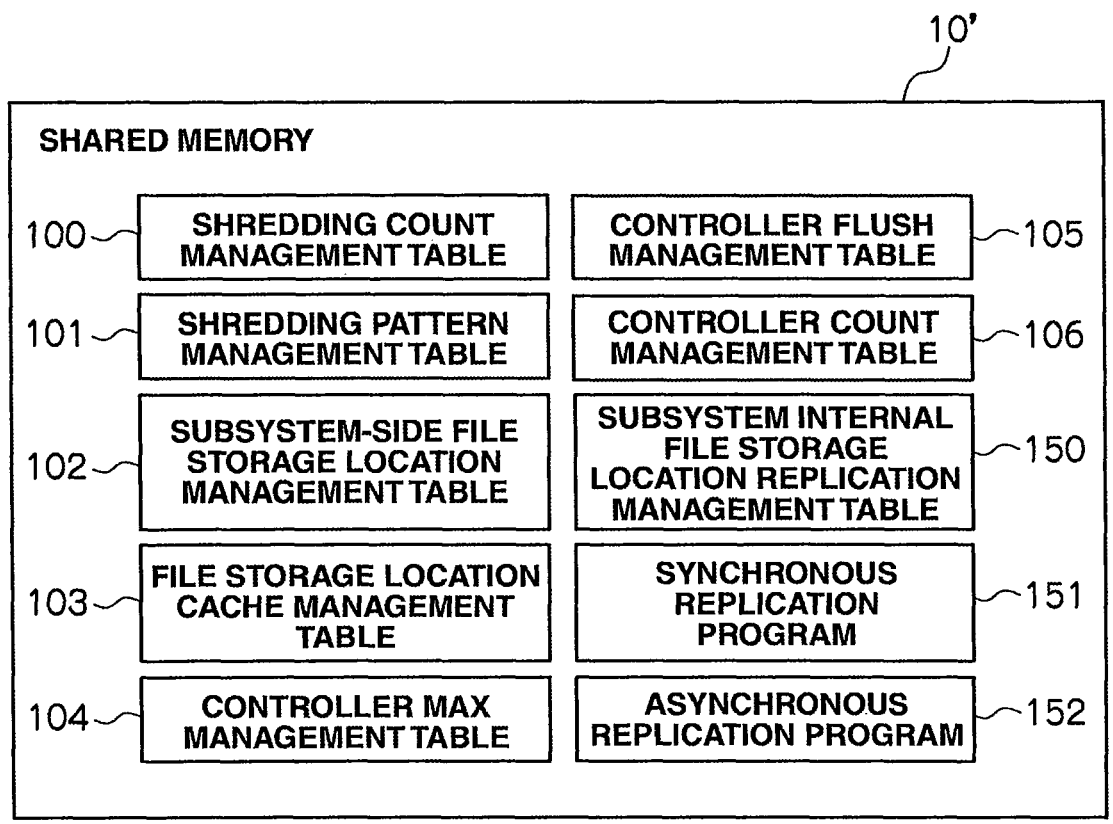
FIG. 36 is a block diagram showing the configuration of a shared memory according to the second embodiment.

As shown in FIG. 36, the shared memory 10' of the storage subsystem 4' stores a subsystem internal file storage location replication management table 150 in addition to the various tables 100 to 106 explained in the first embodiment and the synchronous flush replication program 151 and the asynchronous flush replication program 152 described later.

The memory 21' of the server 2' also stores a synchronous flush replication program (not shown) and an asynchronous flush replication program (not shown) in addition to the various tables 210 to 214 explained in the first embodiment.

As shown in FIG. 37, the subsystem internal file storage location replication management table 150 is a table for managing the relationship of the primary physical disk P-HDD and the secondary physical disk S-HDD storing the same file among the plurality of hard disk drives HDD in the subsystem 4. The subsystem internal file storage location replication management table 150 is configured from a "primary physical disk number" column 150A showing the number information of the primary physical disk P-HDD, a "primary physical disk block number" column 150B showing the block number information in the primary physical disk P-HDD storing the file, a "secondary physical disk number" column 150C, and a "secondary physical disk block number" column 150D.

The "secondary physical disk number" column 150C shows the number information of the secondary physical disk S-HDD pair-configured with the primary physical disk number P-HDD. The "secondary physical disk block number" column 150D shows the block number information in the secondary physical disk S-HDD storing the same file as the primary physical disk block.

(2-3) Flow of Overall File Erasure Processing

The outline of file erasure processing to be performed between the server 2' and the storage subsystem 4' having the pair-configured hard disk drives HDD is now explained.

Figure 38:
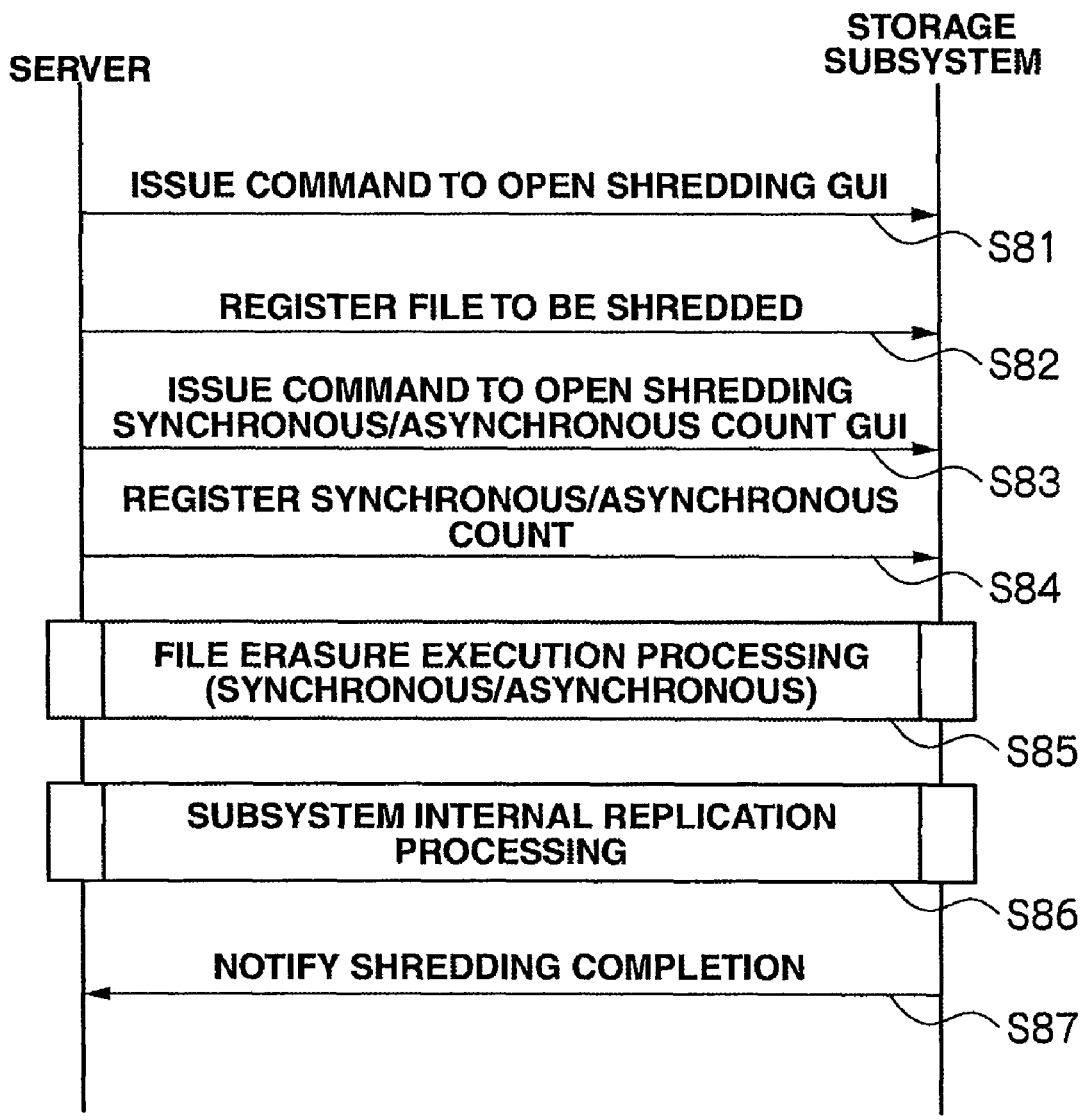
FIG. 38 is a sequence diagram for performing file erasure processing according to the second embodiment.

Specifically, as shown in FIG. 38, the server 2' and the maintenance terminal 13 in the storage subsystem 4' execute the processing from step S81 to step S85 as with the processing from step S1 to step S5A explained with reference to FIG. 20.

Figure 39:
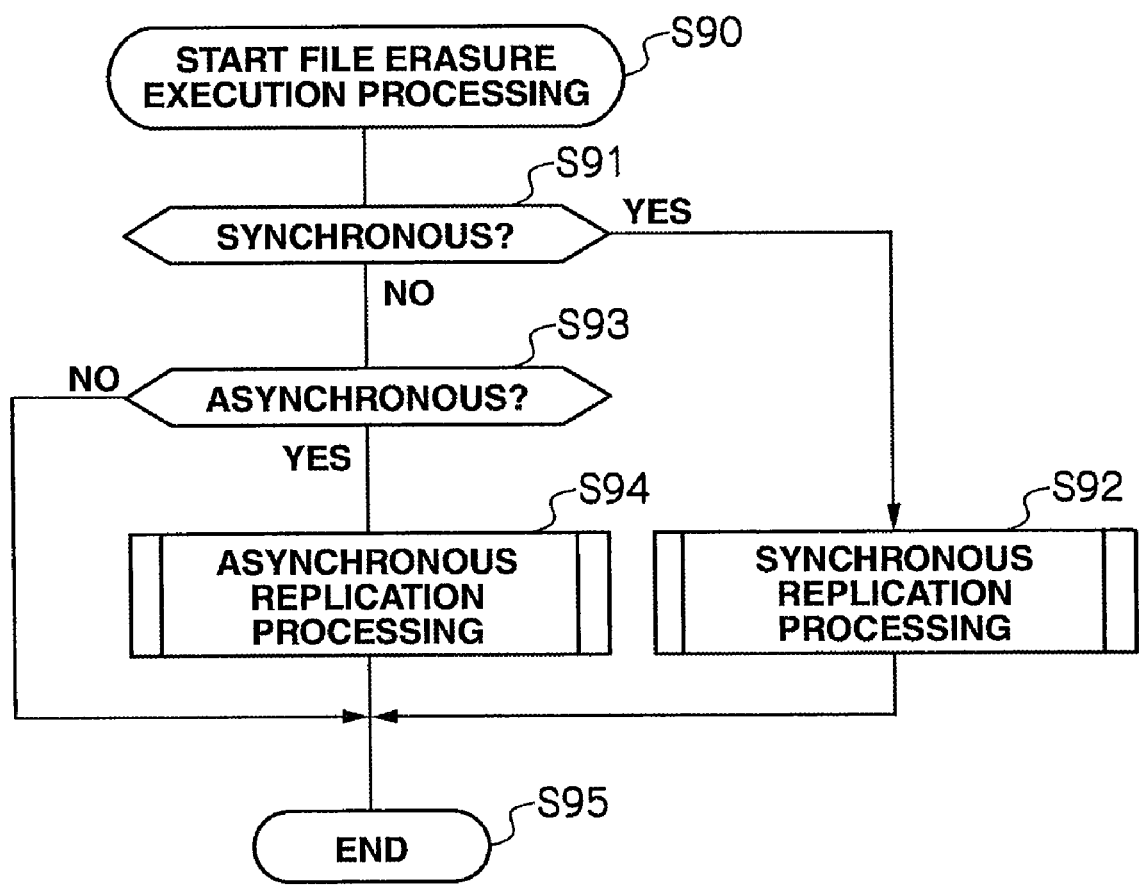
FIG. 39 is a flowchart of file erasure execution processing according to the second embodiment.

The erasure processing at step S85, as shown in FIG. 39, is executed by performing the processing from step S90 to step S95 according to the same routine as the processing from step S10 to step S15 excluding the subroutine processing at step S12 and step S14 explained with reference to FIG. 25.

Subsequently, when the server 2' and the storage subsystem 4' jointly execute replication processing in the subsystem (S86), the storage subsystem 4' thereafter notifies the server 2' that the file erasure execution processing is complete, and then ends the file erasure processing (S87).

(2-3-1) Synchronous Replication Processing

The synchronous replication processing at step S92 is now explained in detail. The synchronous replication processing is executed by the CPU 20 of the server 2' based on the synchronous flush replication program, and executed by the controller 7' of the storage subsystem 4' based on the synchronous flush replication program 151.

Figure 40:
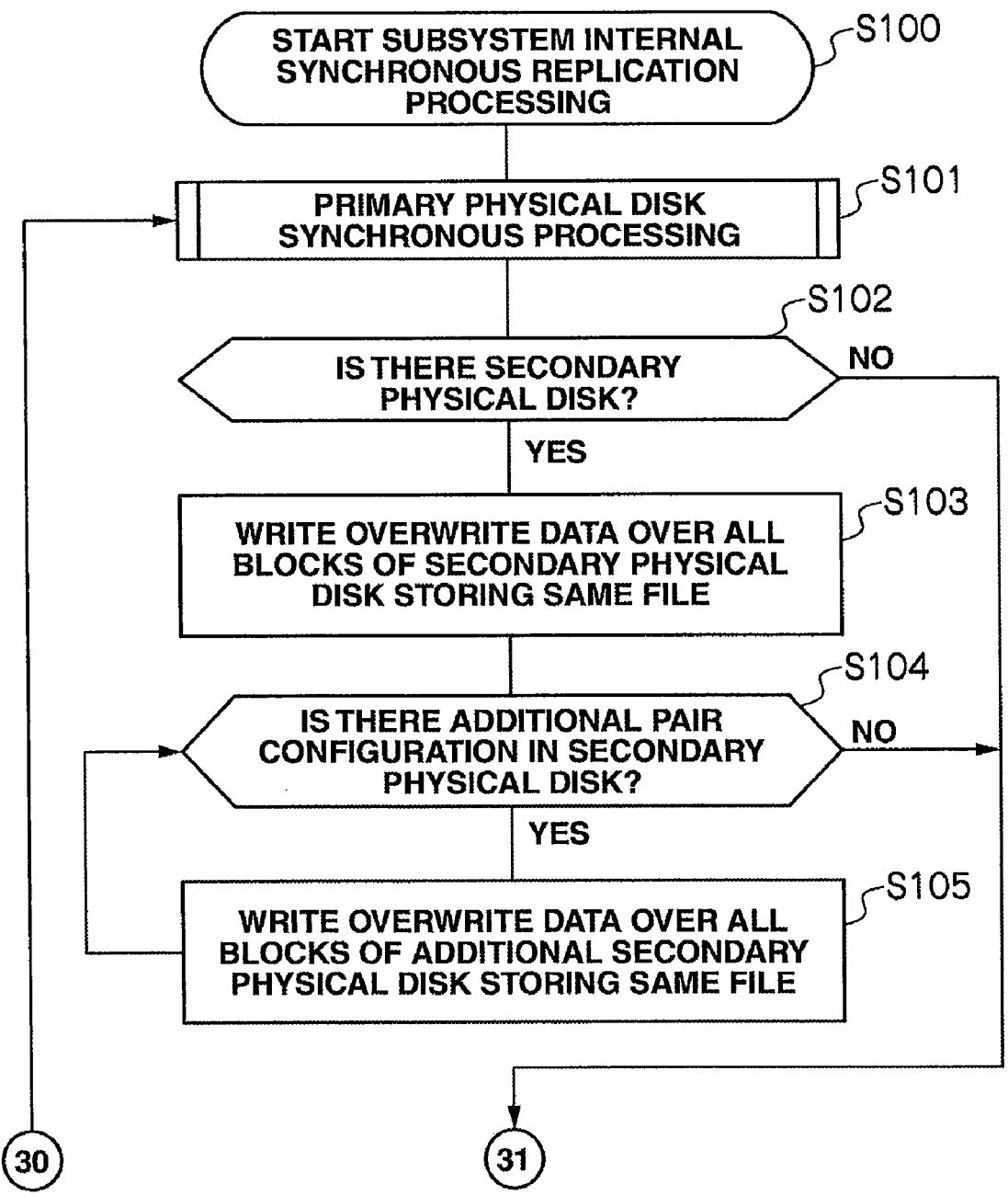
FIG. 40 is a flowchart for performing synchronous replication processing according to the second embodiment.
Figure 41:
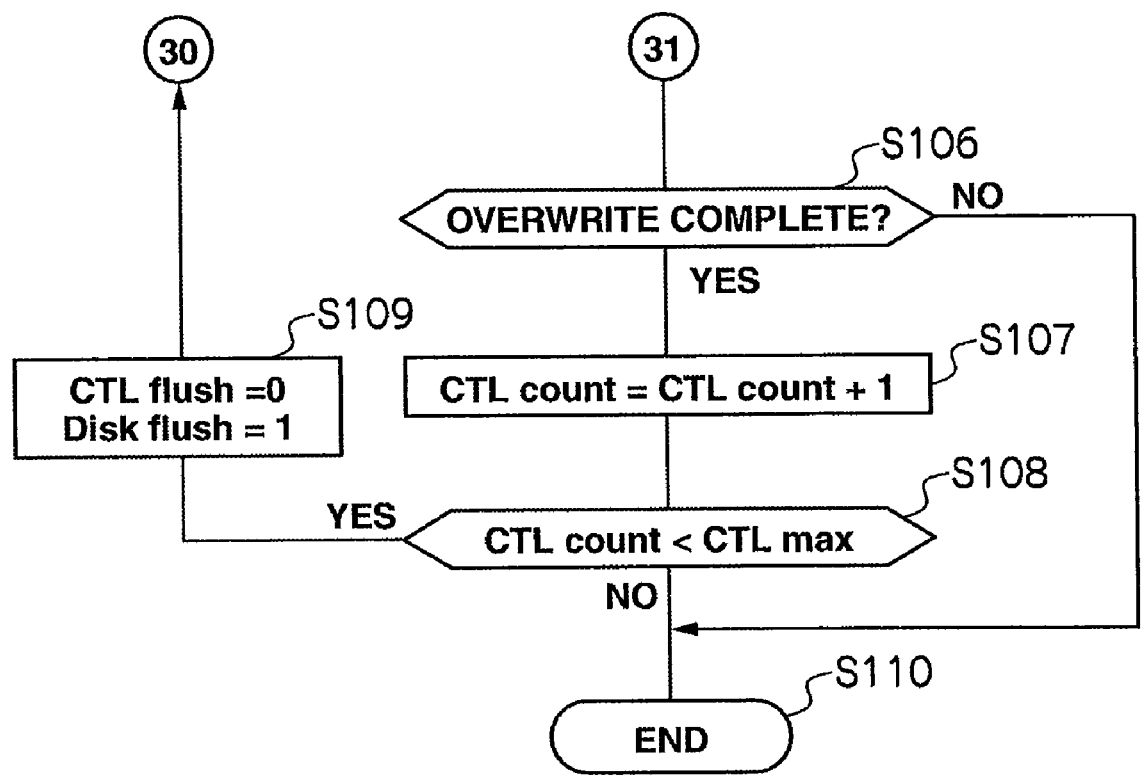
FIG. 41 is a flowchart for performing synchronous replication processing according to the second embodiment.

As shown in FIG. 40 and FIG. 41, when the controller 7' of the storage subsystem 4' determines to send overwrite data toward the data to be erased stored in the primary physical disk P-HDD in a synchronous timing based on the data of the received registered contents, the server 2' and the storage subsystem 4' jointly start the synchronous replication processing (S100).

The CPU 20 of the server 2' and the controller 7' of the storage subsystem 4' execute the synchronous processing to the primary physical disk P-HDD (S101). Specifically, the CPU 20 of the server 2' and the controller 7' of the storage subsystem 4' write the overwrite data over the data to be erased of the primary physical disk P-HDD and erase the data to be erased in file units by executing the processing from step S21 to step S30 explained with reference to FIG. 26 and FIG. 27 (S101).

Subsequently, the controller 7' of the storage subsystem 4' refers to the file storage location replication management table 150 in the subsystem 4 and determines whether there is a secondary physical disk S-HDD pair-configured with the primary physical disk P-HDD (S102).

When the controller 7' of the storage subsystem 4' determines that there is a secondary physical disk S-HDD pair-configured with the primary physical disk P-HDD (S102: YES), it refers to the subsystem internal file storage location replication management table 150, and detects all secondary physical disk blocks pair-configured with all primary physical disk blocks that became the data to be erased. Then, the controller 7' of the storage subsystem 4' sends the overwrite data from the primary physical disk P-HDD, and writes such overwrite data over the data to be erased in all secondary physical disk blocks (S103).

Since this processing is to be performed at a synchronous timing, the controller 7' of the storage subsystem 4' instantaneously executes the overwriting process.

Figure 42:
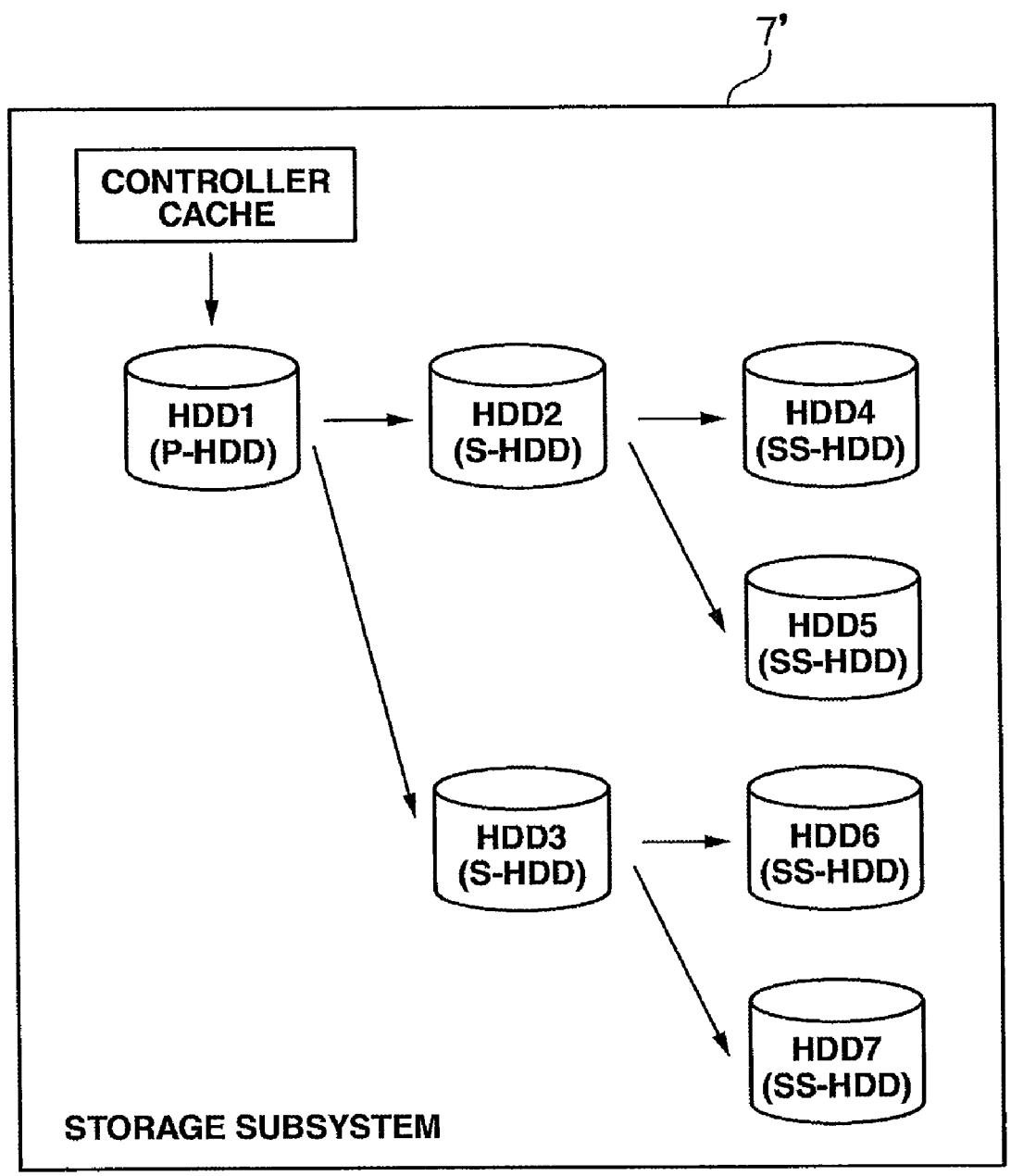
FIG. 42 is a configuration diagram showing the inside of a storage subsystem for performing synchronous replication processing according to the second embodiment.

The image diagram in the foregoing situation is shown in FIG. 42. Let it be assumed that the HDD1 is set to the primary physical disk P-HDD, the HDD2 and the HDD3 are set to the secondary physical disk S-HDD, and the HDD1 and the HDD2 are pair-configured and the HDD1 and the HDD3 are pair-configured, respectively. When overwrite data is written over the data to be erased of the HDD1 from the controller cache 11, overwrite data is directly written over the data to be erased of the HDD2 and the HDD3. When overwriting data on the secondary physical disk S-HDD for the second time onward, overwriting is not performed from the primary physical disk P-HDD to the secondary physical disk S-HDD until the controller 7' receives an overwrite completion notice from the secondary physical disk S-HDD.

Returning to FIG. 40, the controller 7' of the storage subsystem 4' determines whether there is an additional secondary physical disk SS-HDD pair-configured with the secondary physical disk S-HDD (S104).

When the controller 7' of the storage subsystem 4' refers to the subsystem internal file storage location replication management table 150 and determines that there is an additional secondary physical disk SS-HDD pair-configured with the secondary physical disk S-HDD (S104: YES), it sends the overwrite data from the secondary physical disk S-HDD and writes such overwrite data over the data to be erased in all additional secondary physical disk blocks (S105).

Since this processing is executed in a synchronous timing, the controller 7' of the storage subsystem 4' instantaneously executes the overwriting process.

Here, as shown in FIG. 42, the term "additional secondary physical disk SS-HDD" refers to the secondary physical disks HDD4 and HDD5 to be pair-configured with the HDD2 when the secondary physical disk HDD2 is set as the primary physical disk.

When the controller 7' of the storage subsystem 4' once again returns to the processing at step S104 and determines that there is no additional secondary physical disk SS-HDD (S104: NO), it determines whether the overwriting process of all secondary disks S-HDD related to the primary physical disk P-HDD is complete (S106).

When the controller 7' of the storage subsystem 4' determines that the overwriting process of all secondary disks S-HDD related to the primary physical disk P-HDD is complete (S106: YES), it increments the numerical value in the controller count management table 106 by one (S107).

The controller 7' of the storage subsystem 4' refers to the controller max management table 104 and the controller count management table 106 and compares the current overwrite count (indicated as "CTL count" in the drawings) and the maximum overwrite count (indicated as "CTL max" in the drawings) (S108).

If the current overwrite count is less than the maximum overwrite count (S108: YES), the controller 7' of the storage subsystem 4' updates the numerical value in the controller flush management table 105 to zero (flushed), the CPU 20 of the server 2' returns the numerical value in the disk flush management table 213 to 1 (not flushed) (S109), returns once again to step S101, and executes the subsequent overwrite synchronous processing. Meanwhile, if the current overwrite count is not less than the maximum overwrite count (S108: NO), the controller 7' of the storage subsystem 4' ends the synchronous replication processing (S110).

When the controller 7' of the storage subsystem 4' determines at step S102 that there is no secondary physical disk S-HDD pair-configured with the primary physical disk P-HDD (S102: NO), it directly performs the processing at step S106. This processing routine is the same as the processing routine of the synchronous processing explained in the first embodiment.

(2-3-2) Asynchronous Replication Processing

The asynchronous replication processing at step S94 is now explained in detail. The asynchronous replication processing is executed by the CPU 20 of the server 2' based on the asynchronous flush replication program 152, and executed by the controller 7' of the storage subsystem 4' based on the asynchronous flush replication program 152.

Figure 43:
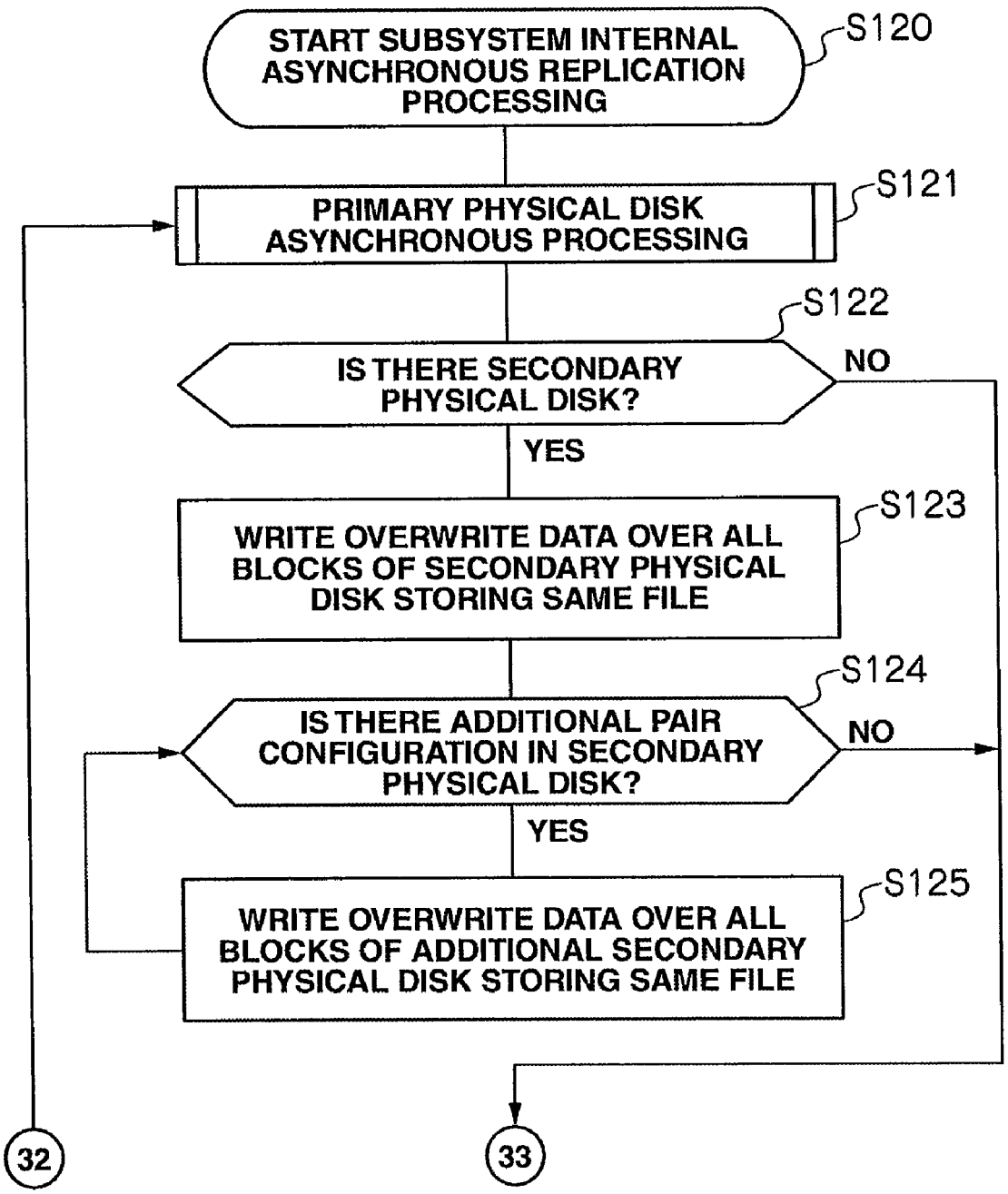
FIG. 43 is a flowchart for performing asynchronous replication processing according to the second embodiment.
Figure 44:
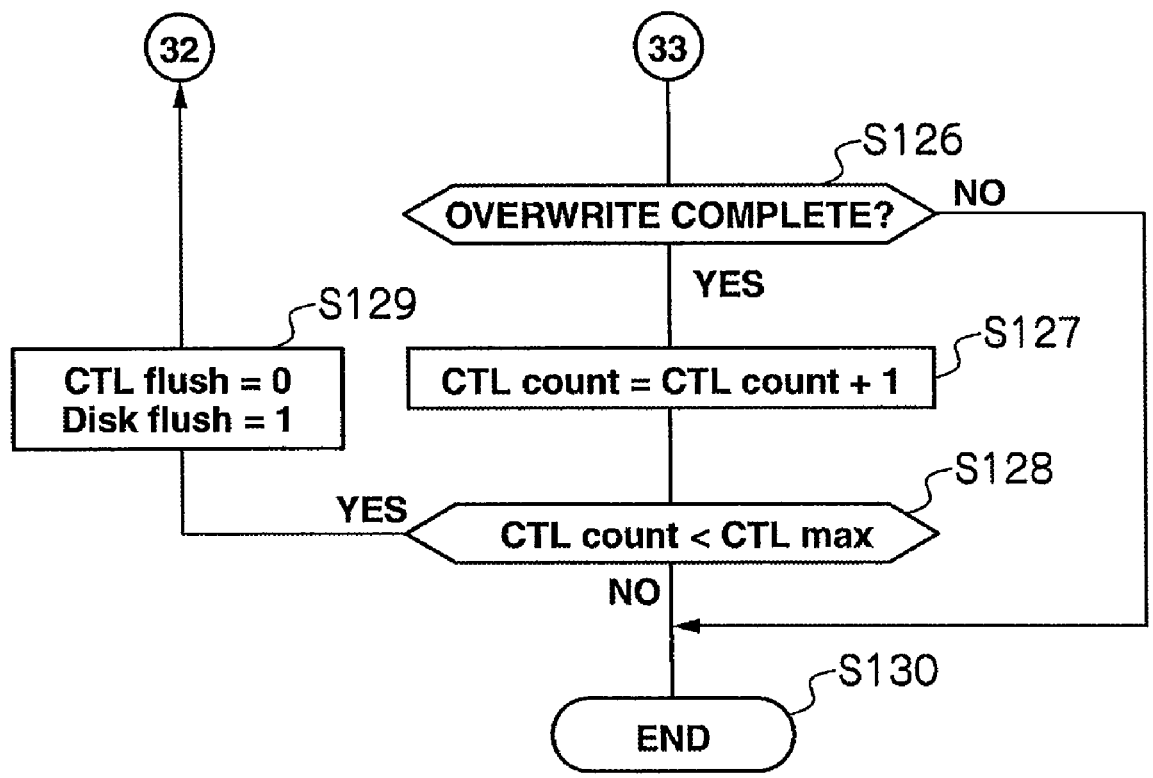
FIG. 44 is a flowchart for performing asynchronous replication processing according to the second embodiment.

As shown in FIG. 43 and FIG. 44, when the controller 7' of the storage subsystem 4' determines to send overwrite data toward the data to be erased stored in the primary physical disk P-HDD in an asynchronous timing based on the data of the received registered contents, the server 2' and the storage subsystem 4' jointly start the asynchronous replication processing (S120).

The CPU 20 of the server 2' and the controller 7' of the storage subsystem 4' execute asynchronous processing to the primary physical disk P-HDD (S121). Specifically, the CPU 20 of the server 2' and the controller 7' of the storage subsystem 4' write the overwrite data over the data to be erased of the primary physical disk P-HDD and erase the data to be erased in file units by executing the processing from step S41 to step S50 and step S54 explained with reference to FIG. 29 and FIG. 30 (S121).

Subsequently, the controller 7' of the storage subsystem 4' performs the processing from step S122 to step S130 according to the same routine as the processing from step S102 to step S110 explained with reference to FIG. 40 and FIG. 41.

However, the overwrite processing at step S123 and step S125 is conducted by the controller 7' of the storage subsystem 4' at an arbitrary asynchronous timing while giving consideration to the load status and the like in the subsystem 4'.

When it is desirable to instantaneously synchronize the primary physical disk P-HDD and the secondary physical disk S-HDD, the controller 7' may issue a partition command to the secondary physical disk S-HDD, and thereafter issue a re-synchronization command.

(2-4) Effect of Second Embodiment

According to the present embodiment, data in the storage system is managed in file units. Thus, in both cases of synchronous processing and asynchronous processing, the overwrite command that is issued a plurality of times from the server 2 can be reliably reflected in the disk cache, the controller cache and the hard disk drive. Thereby, the data to be erased stored in the respective areas can be overwritten reliably, and the data to be erased can be erased in file units. According to this embodiment, it is possible to reliably prevent information leakage.

In addition, according to the present embodiment, the overwrite command is reflected in all hard disk drives that are pair-configured in the storage subsystem 4, and data to be erased in the secondary physical disk can also be reliably erased.

(3) Third Embodiment (3-1) Configuration of Storage System

Figure 45:
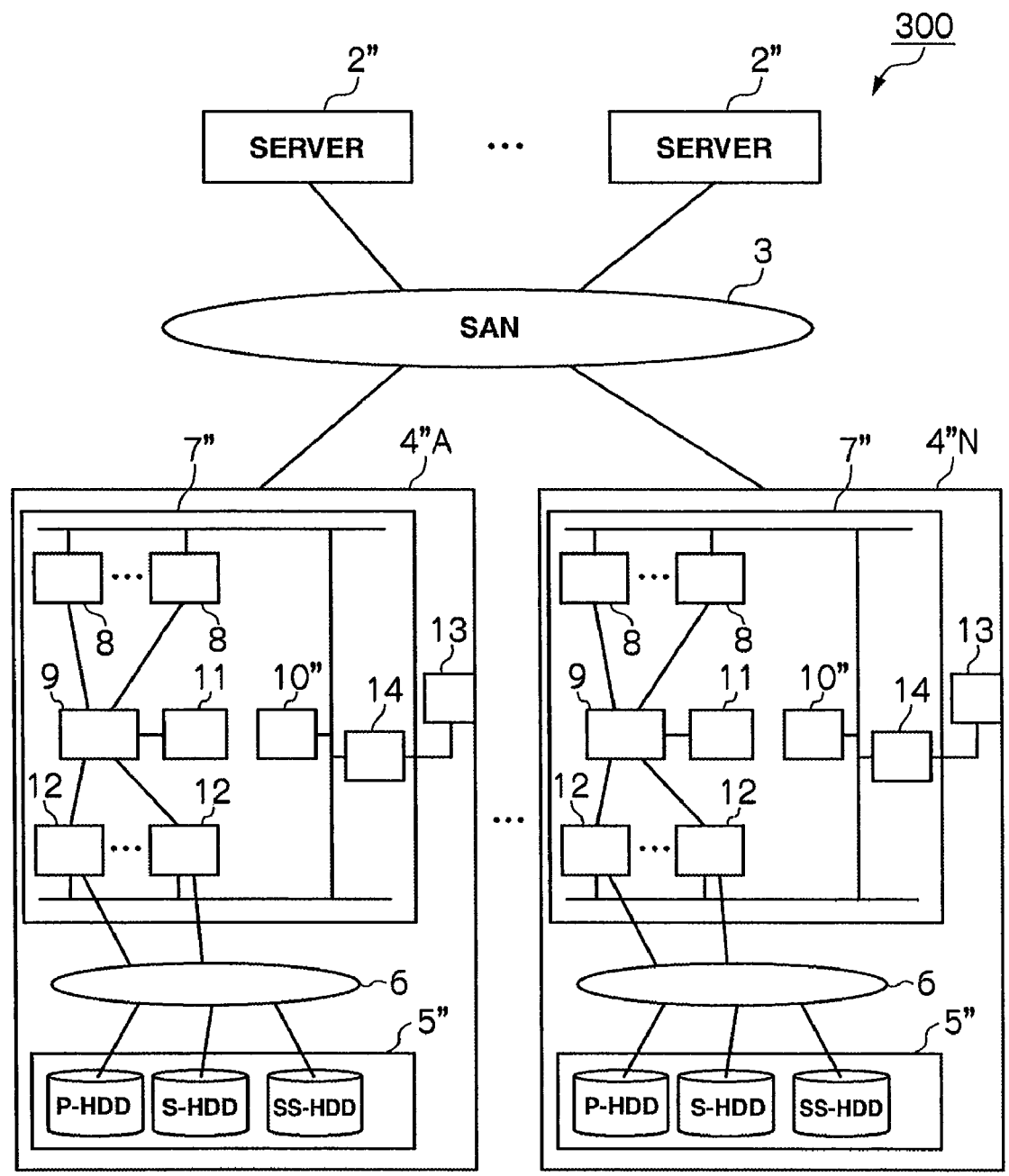
FIG. 45 is a block diagram showing the overall configuration of a storage system according to the third embodiment.

FIG. 45 shows the overall storage system 300 according to the present embodiment.

The storage system 300 of this embodiment is configured by pair-configuring a plurality of hard disk drives HDD in the storage subsystem 4 explained in the first embodiment (storage subsystem 4"A in the third embodiment), and additionally pair-configuring such hard disk drives HDD with a plurality of hard disk drives HDD in another storage subsystem 4"N.

The storage system 300 sets the hard disk drive HDD to directly receive the overwrite data from the server 2" and write such overwrite data over the data to be erased as a primary hard disk drive P-HDD. In addition, the storage system 300 sets this primary physical disk P-HDD as the copy source, and sets the pair-configured secondary hard disk drive S-HDD in the storage subsystem 4"A or pair-configured with another storage subsystem 4"N as the copy destination.

The remaining configuration is the same as the configuration of the storage system 1 according to the first embodiment, and the detailed description thereof is omitted. In addition, the same reference numeral is given to the same component as in the first embodiment.

(3-2) Inter-Subsystem File Storage Location Replication Management Table

Figure 46:
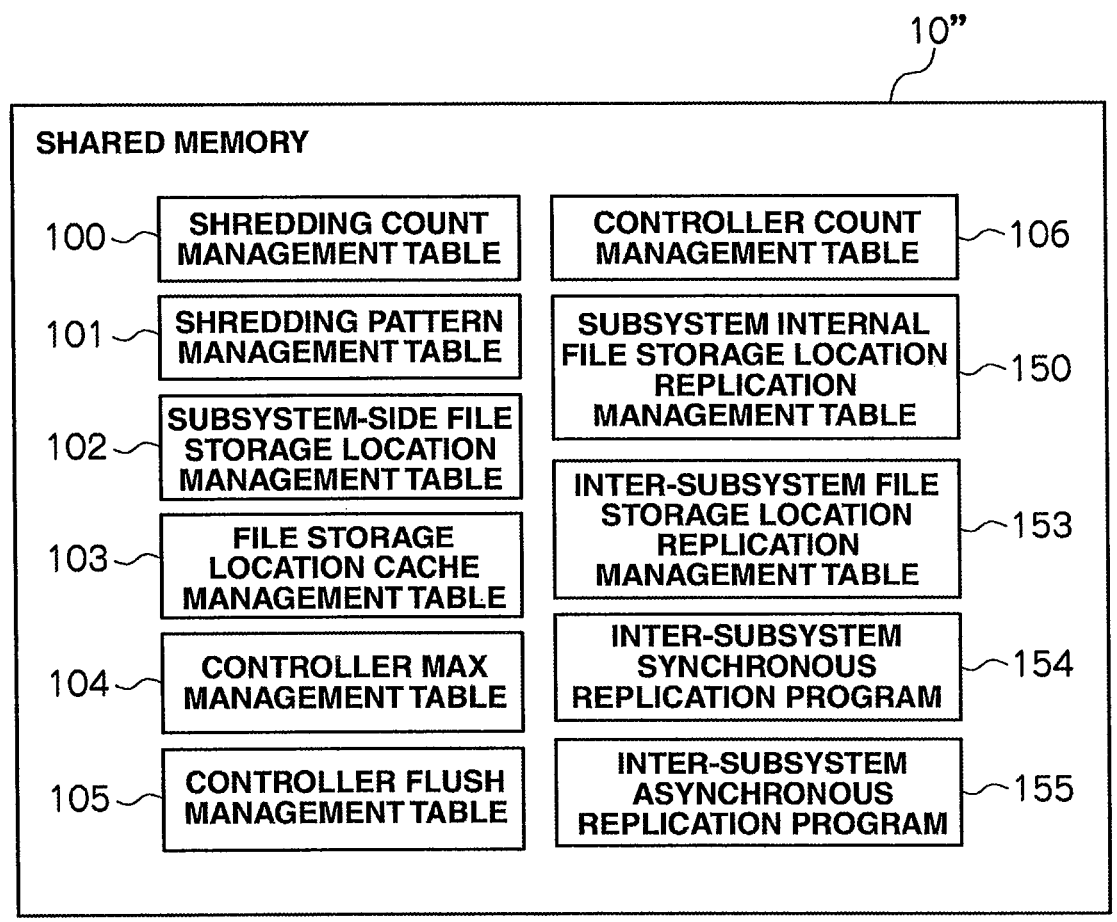
FIG. 46 is a block diagram showing the configuration of a shared memory according to the third embodiment.

As shown in FIG. 46, the shared memory 10" of each storage subsystem 4" stores an inter-subsystem file storage location replication management table 153 in addition to the various tables 100 to 106 explained in the first embodiment, the subsystem internal file storage location replication management table 150, and the inter-subsystem synchronous flush replication program 154 and the inter-subsystem asynchronous flush replication program 155 described later.

The memory (not shown) of the server 2" also stores an inter-subsystem synchronous flush replication program (not shown) and an inter-subsystem asynchronous flush replication program (not shown) in addition to the various tables 210 to 214 explained in the first embodiment.

As shown in FIG. 47, the inter-subsystem file storage location replication management table 153 is a table for managing the relationship of the primary physical disk P-HDD and the secondary physical disk S-HDD storing the same file among the plurality of hard disk drives HDD in the subsystem 4". The inter-subsystem file storage location replication management table 153 is configured from a "primary storage subsystem apparatus number" column 153A showing the apparatus number of the primary storage subsystem 4"A to directly receive the overwrite data from the server 2", a "primary physical disk number" column 153B, a "primary physical disk block number" column 153C, a "secondary storage subsystem apparatus number" column 153D, a "secondary physical disk number" column 153E, and a "secondary physical disk block number" column 153F.

The "secondary storage subsystem apparatus number" column 153D shows the apparatus number of the secondary storage subsystem 4"N to receive the overwrite data sent from the primary storage subsystem 4"A.

The "primary physical disk number" column 153B, the "primary physical disk block number" column 153C, the "secondary physical disk number" column 153E, and the "secondary physical disk block number" column 153F are the same items included in the subsystem internal file storage location replication management table 150 explained in the second embodiment, and the detailed explanation thereof is omitted.

(3-3) Flow of Overall File Erasure Processing

The outline of file erasure processing to be performed between the server 2" and the storage subsystem 4" having the pair-configured hard disk drives HDD is now explained.

Figure 48:
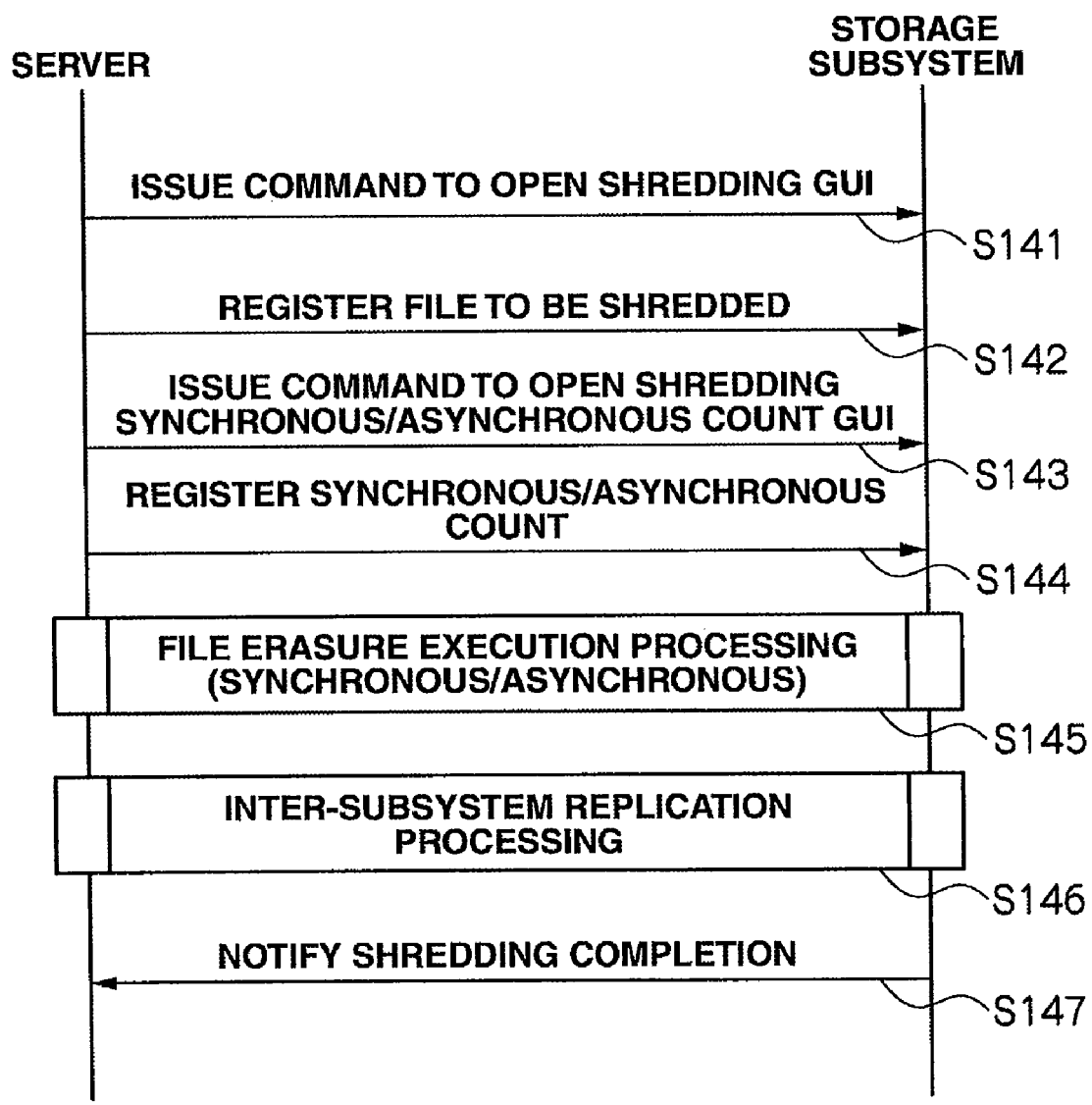
FIG. 48 is a sequence diagram for performing file erasure processing according to the third embodiment.

Specifically, as shown in FIG. 48, the server 2" and the maintenance terminal in the primary and secondary storage subsystems 4" execute the processing from step S141 to step S145 as with the processing from step S1 to step S5A explained with reference to FIG. 20.

In the erasure processing at step S145, the primary storage subsystem 4"A will execute either the synchronous replication processing or the asynchronous replication processing.

Subsequently, when the server 2" and the primary and secondary storage subsystems 4" jointly execute synchronous or asynchronous replication processing (S146), the primary storage subsystem 4"A thereafter notifies the server 2" that the file erasure execution processing is complete, and then ends the file erasure processing (S147).

(3-3-1) Synchronous Replication Processing

The synchronous replication processing at step S145 is now explained in detail. The synchronous replication processing is executed by the CPU (not shown) of the server 2" based on the inter-subsystem synchronous flush replication program, and executed by the controller 7" of the primary and secondary storage subsystems 4" based on the inter-subsystem synchronous flush replication program 154.

Figure 49:
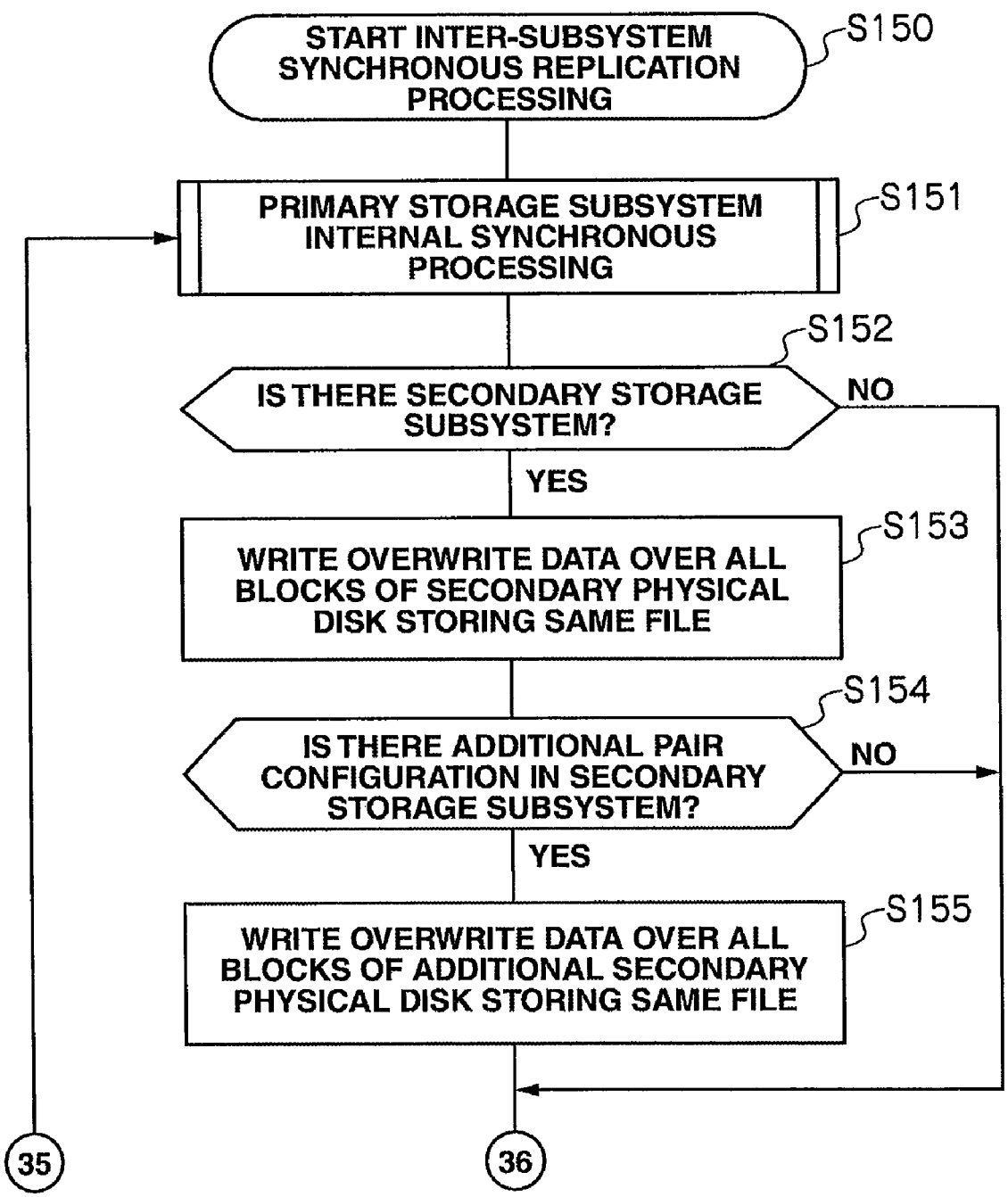
FIG. 49 is a flowchart for performing synchronous replication processing according to the third embodiment.
Figure 50:
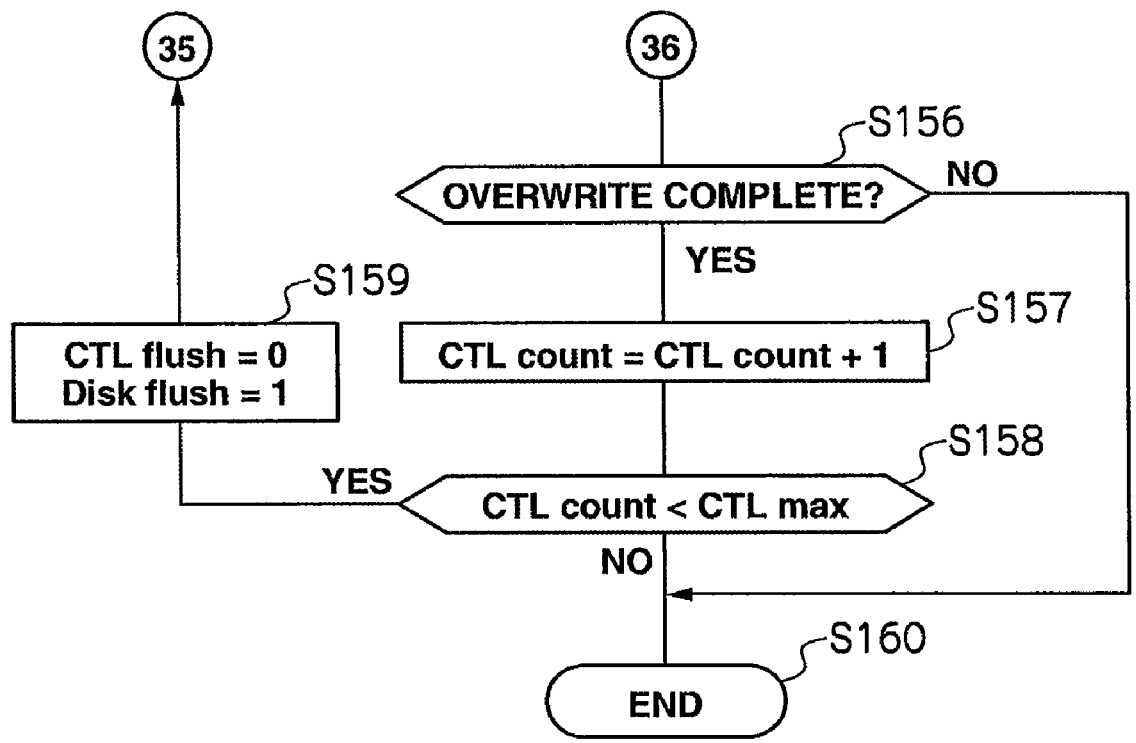
FIG. 50 is a flowchart for performing synchronous replication processing according to the third embodiment.

As shown in FIG. 49 and FIG. 50, when the controller 7" of the primary storage subsystem 4"A determines to send overwrite data toward the data to be erased stored in the primary physical disk P-HDD in a synchronous timing based on the data of the received registered contents, the server 2" and the primary storage subsystem 4"A jointly start the synchronous replication processing (S150).

The CPU of the server 2" and the controller 7" of the primary storage subsystem 4"A execute the synchronous processing to the primary physical disk P-HDD, and execute the replication processing in the primary storage subsystem 4"A (S151). Specifically, the CPU 20 of the server 2" and the controller 7" of the storage subsystem 4" write the overwrite data over the data to be erased of the primary physical disk P-HDD and erase the data to be erased in file units by executing the processing from step S101 to step S105 explained with reference to FIG. 40. Subsequently, the controller 7" of the primary-side storage subsystem 4"A refers to the subsystem internal file storage location replication management table 150, and writes overwrite data over the data to be erased in the secondary physical disk S-HDD if it possess the secondary physical disks S-HDD pair-configured in the primary storage subsystem 4"A.

The controller 7" of the primary storage subsystem 4"A refers to the inter-subsystem file storage location replication management table 153, and determines whether there is a pair-configured secondary storage subsystem 4"N (S152).

When the controller 7" of the primary storage subsystem 4"A determines that there is a pair-configured secondary storage subsystem 4"N (S152: YES), it sends the overwrite data that was overwritten in the primary physical disk P-HDD to the secondary storage subsystem 4"N.

When the controller 7" of the secondary storage subsystem 4"N receives the overwrite data, it refers to the inter-subsystem file storage location replication management table 153 and writes overwrite data over all blocks of the secondary physical disk S-HDD pair-configured with the primary physical disk P-HDD (S153). Since this step is executed at a synchronous timing, the controller instantaneously performs the overwriting process.

Subsequently, the controller 7" of the secondary storage subsystem 4"N refers to the subsystem internal file storage location replication management table 150 of the secondary storage subsystem 4"N, and determines whether there is an additional secondary physical disk SS-HDD that is pair-configured in the secondary storage subsystem 4"N (S154).

When the controller 7" of the secondary storage subsystem 4"N determines that there is an additional secondary physical disk SS-HDD (S154: YES), it writes overwrite data over all blocks of the additional secondary physical disk SS-HDD storing the same file as the secondary physical disk S-HDD (S155). Since this step is executed at a synchronous timing, the controller instantaneously performs the overwriting process.

The controller 7" of the secondary storage subsystem 4"N thereafter determines whether the overwriting process is complete (S156). After the overwriting process is complete (S156: YES), the controller 7" of the primary and secondary storage systems 4" increments the numerical value in the respective controller count management tables 106 by one (S157).

The controller 7" of the primary storage system 4"A performs the processing from step S158 to step S160 according to the same routine as the processing from step S33 to step S35 (FIG. 27 and FIG. 28), and then ends the synchronous replication processing.

When the controller 7" of the secondary storage subsystem 4"N determines at step S152 and S154 that there is no pair-configured secondary storage subsystem 4"N (S152: NO) or there is no additional secondary physical disk SS-HDD (S154: NO), it executes the processing determination at step S156.

Figure 51:
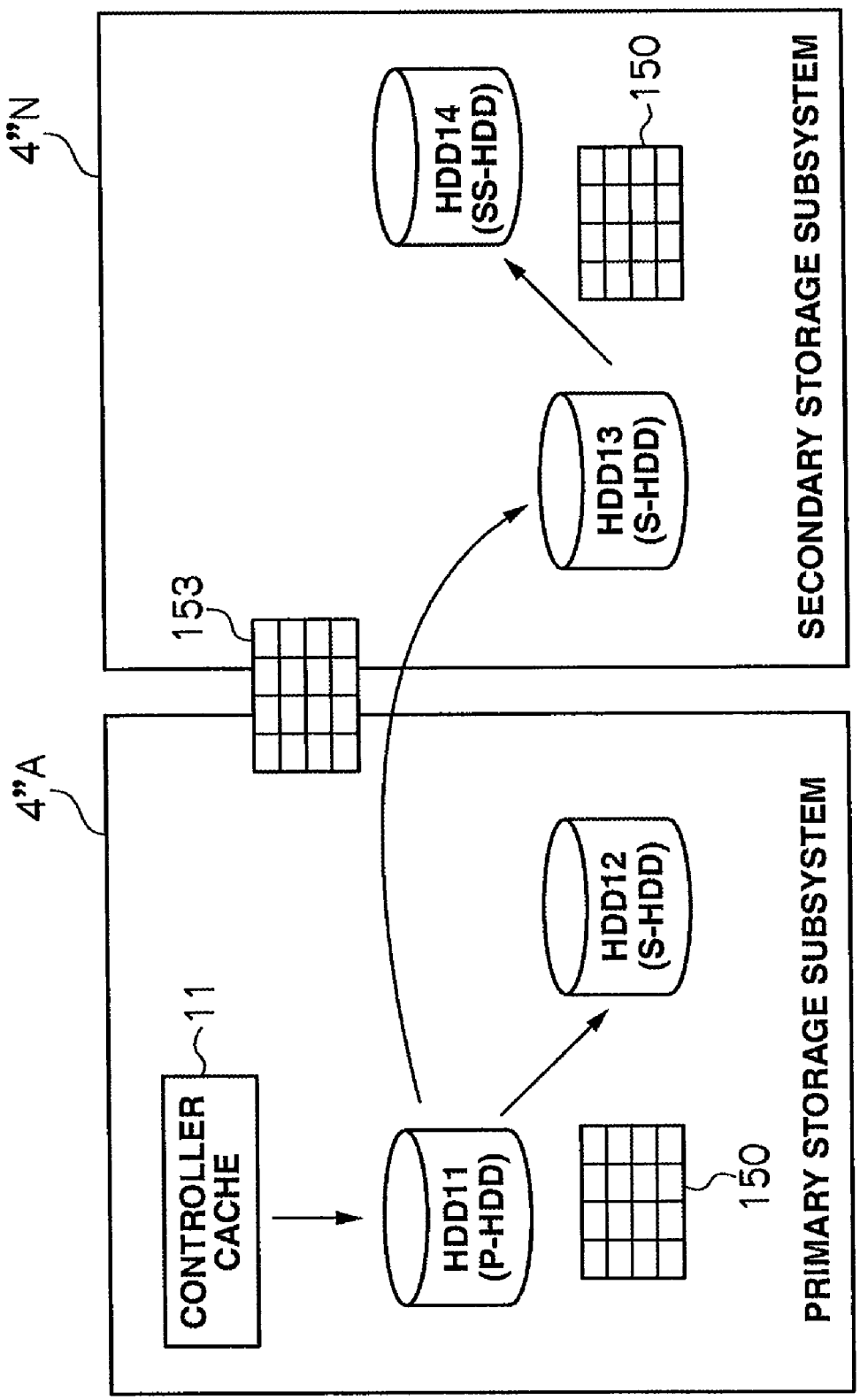
FIG. 51 is a configuration diagram showing the inside of a storage subsystem for performing synchronous replication processing according to the third embodiment.

The image diagram of this synchronous replication processing is shown in FIG. 51. Let it be assumed that the HDD11 is set to the primary physical disk P-HDD, the HDD12 is set to the secondary physical disk S-HDD pair-configured with the primary physical disk P-HDD in the storage subsystem 4"A, the HDD13 is set to the secondary physical disk S-HDD in another storage subsystem 4"N pair-configured with the primary physical disk P-HDD, and the HDD14 is set to the additional secondary physical disk SS-HDD pair-configured with the secondary physical disk S-HDD in the other storage subsystem 4"N.

The controller 7" of the primary storage subsystem 4"A refers to the subsystem internal file storage location replication management table 150 in the storage subsystem 4"A when overwrite data is written over the data to be erased of the HDD11 from the controller cache 11, and writes overwrite data over the data to be erased of the HDD12. The controller 7" of the primary storage subsystem 4"A refers to the inter-subsystem file storage location replication management table 153, and sends the overwrite data from the HDD12 to the HDD13. Then, the controller 7" of the other storage subsystem 4"N overwrites the overwrite data in the HDD13. Subsequently, the controller 7" of the other storage subsystem 4"N refers to the subsystem internal file storage location replication management table 150 in the other storage subsystem 4"N, and overwrites the overwrite data from the HDD13 to the HDD14.

When there are no hard disk drives HDD that have been pair-configured in the respective storage subsystems 4" and there are only the hard disk drives (only HDD11 and HDD13) pair-configured between the storage subsystems 4", the overwrite data from the primary physical disk P-HDD in the primary storage subsystem 4"A is overwritten in the secondary physical disk S-HDD of the secondary storage subsystem 4"N.

Like this, the overwrite data is overwritten in all physical disks that are pair-configured.

(3-3-2) Asynchronous Replication Processing

The asynchronous replication processing at step S145 is now explained in detail. The asynchronous replication processing is executed by the CPU (not shown) of the server 2" based on the inter-subsystem asynchronous flush replication program, and executed by the controller 7" of the primary and secondary storage subsystems 4" based on the inter-subsystem asynchronous flush replication program 155.

Figure 52:
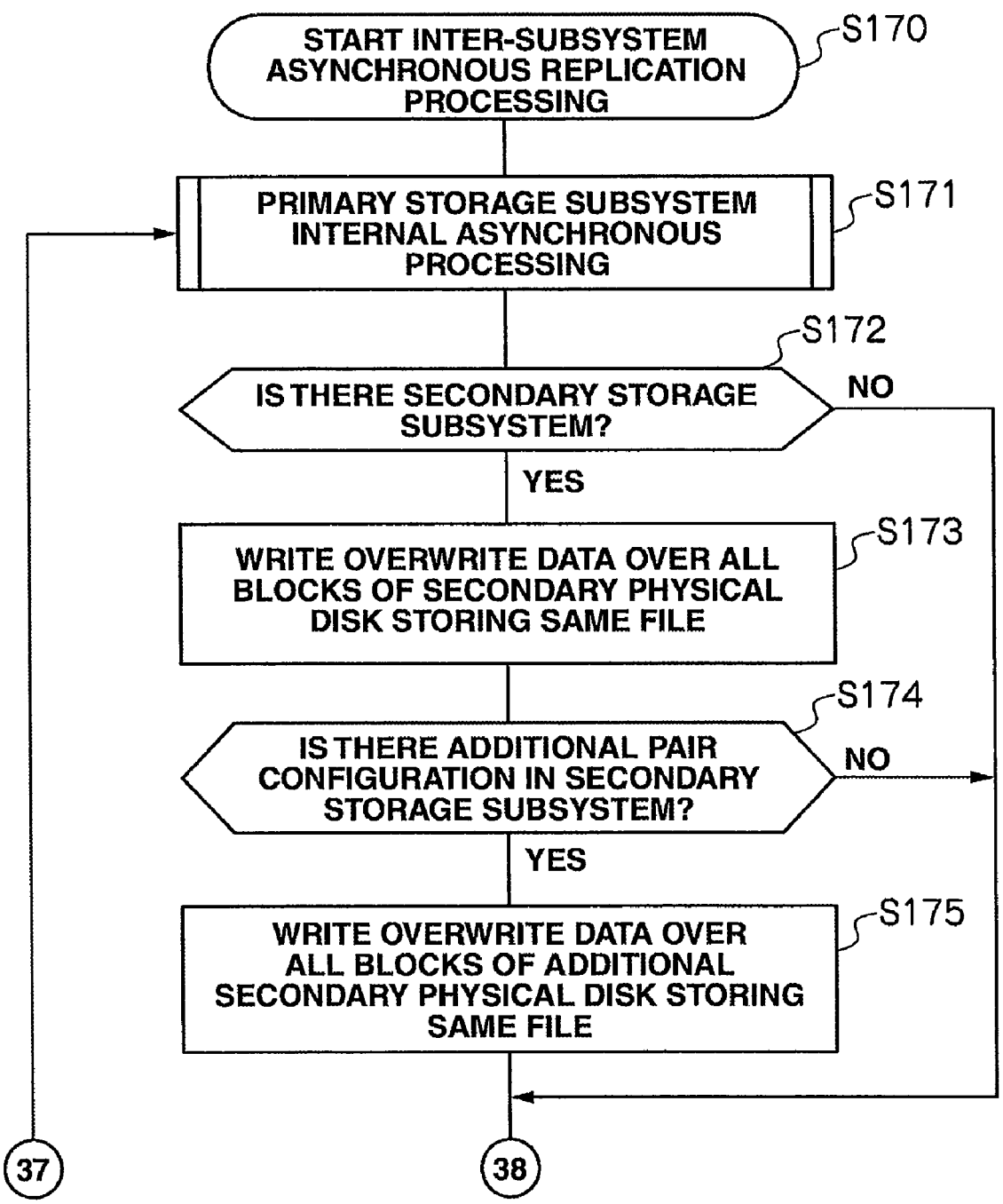
FIG. 52 is a flowchart for performing asynchronous replication processing according to the third embodiment.
Figure 53:
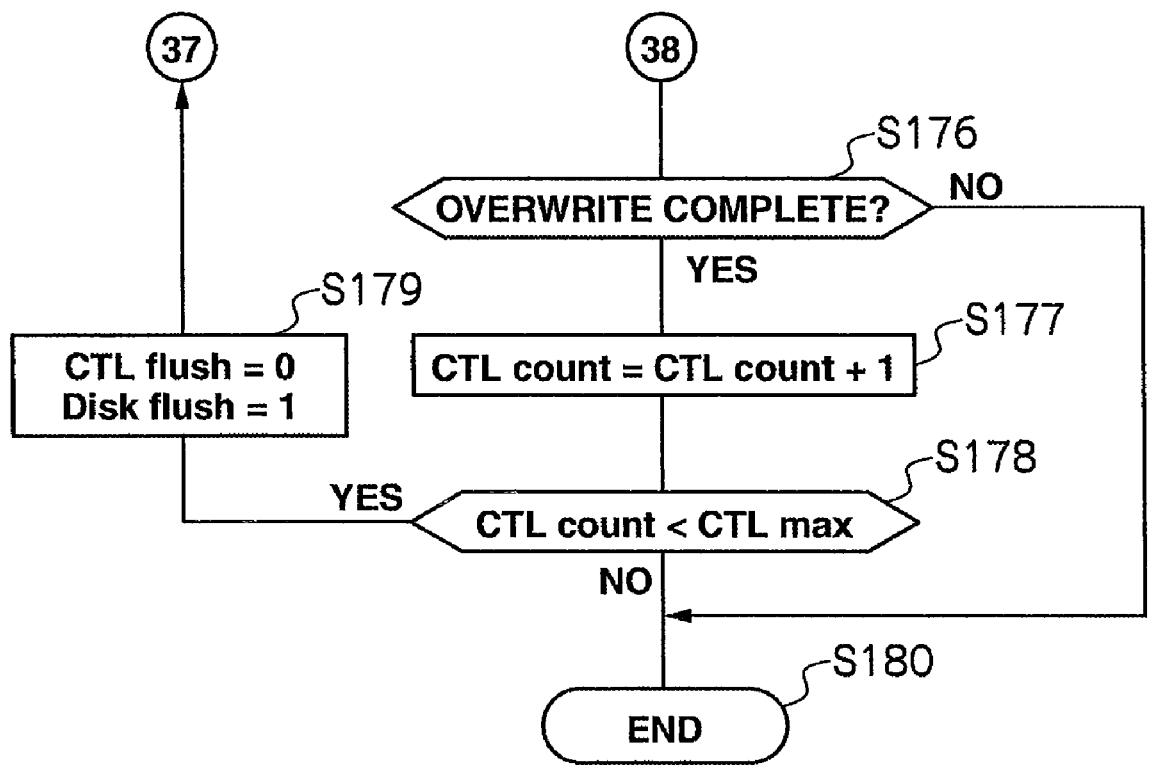
FIG. 53 is a flowchart for performing asynchronous replication processing according to the third embodiment.

As shown in FIG. 52 and FIG. 53, when the controller 7" of the primary storage subsystem 4"A determines to send overwrite data toward the data to be erased stored in the primary physical disk P-HDD in an asynchronous timing based on the data of the received registered contents, the server 2" and the primary storage subsystem 4"A jointly start the asynchronous replication processing (S170).

The CPU 20 of the server 2" and the controller 7" of the primary storage subsystem 4"A execute the asynchronous processing to the primary physical disk P-HDD, and execute the replication processing in the primary storage subsystem 4"A (S171). Specifically, the CPU 20 of the server 2" and the controller 7" of the storage subsystem 4" execute the processing from step S121 to step S125 explained with reference to FIG. 43.

Subsequently, the controller 7" of the primary-side storage subsystem 4"A and the controller 7" of the secondary storage subsystem 4"N jointly execute the processing from step S172 to step S180 according to the same routine as the processing from step S152 to step S160 explained with reference to FIG. 49 and FIG. 50, and then ends the asynchronous replication processing.

However, the overwrite processing at step S173 and step S175 is conducted by the controller 7" of the secondary storage subsystem 4"N at an arbitrary asynchronous timing while giving consideration to the load status and the like in the secondary storage subsystem 4"N.

(3-4) Effect of Third Embodiment

According to the present embodiment, data in the storage system is managed in file units. Thus, in both cases of synchronous processing and asynchronous processing, the overwrite command that is issued a plurality of times from the server 2 can be reliably reflected in the disk cache, the controller cache and the hard disk drive. Thereby, the data to be erased stored in the respective areas can be overwritten reliably, and the data to be erased can be erased in file units. According to this embodiment, it is possible to reliably prevent information leakage.

In addition, according to the present embodiment, the overwrite command is reflected in all hard disk drives that are pair-configured between the storage subsystems 4, and data to be erased in the secondary physical disk of the other storage subsystem 4 can also be reliably erased.

(4) Other Embodiments

The storage period of data in the storage subsystem can also be managed such that the file erasure processing explained in the first to third embodiments is executed only when data in the hard disk drive has been retained past a given period of time.

Although the server and the storage subsystem jointly delete the target data in file units in the first to third embodiments, the storage subsystem may be provided with the functions to be performed by the server so that only the storage subsystem manages the overwrite status of the disk cache, the controller cache, and the hard disk drive.

The present invention may be broadly applied to a storage system including one or more storage apparatuses, as well as to storage systems of various other modes.

What is claimed is:

1. A storage system including a server, and a storage subsystem connected to said server and having a hard disk drive storing a plurality of files, said server comprising:
a disk cache for temporarily storing data to be sent to said storage subsystem; and a server controller controlling said server, said storage subsystem comprising:
a controller cache for temporally storing data sent from said server, to be written to said hard disk drive in said storage subsystem, and a subsystem controller controlling said storage subsystem, wherein, the storage system manages the respective addresses of said disk cache, said controller cache and said hard disk drive storing the same file, wherein, when said storage system executes a file erasing process for a certain file of said plurality of files by respectively overwriting said certain file stored in respective addresses of said disk cache, said controller cache and said hard disk drive with a plurality of erasing data including a first erasing data and a second erasing data, wherein said subsystem controller manages whether or not data stored in said controller cache is already written to said hard disk, and wherein said server controller is configured to:
judge if said first erasing data stored in said controller cache is already written to said hard disk based on a communication with said subsystem controller,
send, if said first erasing data is already written to said hard disk according to the judgment, said second erasing data in said disk cache to said storage subsystem so that the subsystem controller can write not only said second erasing data but also said first erasing data to said hard disk drive.

2. The storage system according to claim 1, wherein said subsystem controller writes data sent from said server to said controller cache and writes data stored in said controller cache to said hard disk drive in an asynchronous timing.

3. The storage system according to claim 2, wherein one or more storage subsystems are connected to said server;
  wherein said storage subsystem has a plurality of hard disk drives storing said certain file to be erased;
    wherein said plurality of hard disk drives are pair-configured in a storage subsystem or between a plurality of storage subsystems; and
    wherein said plurality of erasing data sent from said controller cache is written over data to be erased stored in a primary hard disk drive, and said plurality of erasing data is sent from said primary hard disk drive at a timing that is synchronous or asynchronous with said overwrite timing and written over data to be erased stored in a pair-configured secondary hard disk drive.

* * * * *